(12) United States Patent
Otterstrom et al.

(10) Patent No.: US 12,663,668 B1
(45) Date of Patent: Jun. 23, 2026

(54) WIDEBAND ACOUSTO-OPTIC MODULATOR/ISOLATOR IN INTEGRATED PHOTONICS

(71) Applicants: National Technology & Engineering Solutions of Sandia, LLC, Albuquerque, NM (US); Yale University, New Haven, CT (US); The Regents of the University of California, Oakland, CA (US)

(72) Inventors: Nils Thomas Otterstrom, Edgewood, NM (US); Peter Rakich, New Haven, CT (US); Yishu Zhou, New Haven, CT (US); Freek Ruesink, Oegstgeest (NL); Hoatian Cheng, New Haven, CT (US); Shai Gertler, Vienna (AT); Eric Kittlaus, Altadena, CA (US); John Bowers, Santa Barbara, CA (US)

(73) Assignees: National Technology & Engineering Solutions of Sandia, LLC., Albuquerque, NM (US); The Regents of the University of California, Oakland, CA (US)

( * ) Notice: Subject to any disclaimer, the term of this patent is extended or adjusted under 35 U.S.C. 154(b) by 272 days.

(21) Appl. No.: 18/488,194

(22) Filed: Oct. 17, 2023

(51) Int. Cl.
G02F 1/11 (2006.01)
G02B 6/12 (2006.01)
(Continued)

(52) U.S. Cl.
CPC ............... G02F 1/11 (2013.01); G02F 1/125 (2013.01); G02B 6/12004 (2013.01);
(Continued)

(58) Field of Classification Search
CPC . G02F 1/11; G02F 1/125; G02F 1/116; G02F 1/113; G02B 6/12004; G02B 6/1225; G02B 2006/12142; G02B 2006/12157
See application file for complete search history.

(56) References Cited

U.S. PATENT DOCUMENTS

| | | | | | |
|---|---|---|---|---|---|
| 5,418,866 A | * | 5/1995 | Chu | ......................... | H03H 9/42 |
| | | | | | 385/132 |
| 5,652,809 A | * | 7/1997 | Aronson | ................. | G02F 1/125 |
| | | | | | 385/11 |

(Continued)

FOREIGN PATENT DOCUMENTS

| | | | | | |
|---|---|---|---|---|---|
| AU | 2022224881 A1 | * | 9/2023 | ............. | G10K 11/36 |
| CN | 104991356 B | * | 2/2018 | ............. | G02F 1/113 |
| CN | 116300156 A | * | 6/2023 | ............. | G02F 1/125 |

OTHER PUBLICATIONS

Yu et al., Machine Translation of CN 104991356 B, Sep. 14, 2023. (Year: 2023).*
Wan et al., Machine Translation of CN 116300156 A, Jun. 23, 2023. (Year: 2023).*
Kittlaus et al. ("Nonreciprocal Modulation via Intermodal Brillouin Scattering in a Silicon Waveguide", CLEO 2018, OSA 2018.) (Year: 2018).*

(Continued)

*Primary Examiner* — Michelle R Connelly
(74) *Attorney, Agent, or Firm* — Mark A. Dodd

(57) ABSTRACT

An acousto-optic device employing strong interband coupling in a multi-mode, spiral-shaped optomechanical waveguide is disclosed. The acousto-optic device includes multiple interdigitated transducers to produce phonons, which are directed to the optomechanical waveguide at an angle. By confining the produced phonons to the optomechanical waveguide, using phonon confining elements and/or a suspended structure, the interband coupling is increased. Through the use of spatial mode multiplexers at either end of the optomechanical waveguide to block or pass different spatial optical modes, one can create an acousto-optic modulator or an optical isolator.

20 Claims, 16 Drawing Sheets

(51) Int. Cl.
    *G02B 6/122*        (2006.01)
    *G02F 1/125*        (2006.01)

(52) U.S. Cl.
    CPC .............. *G02B 2006/12142* (2013.01); *G02B 2006/12157* (2013.01); *G02B 6/1225* (2013.01)

(56)        References Cited

U.S. PATENT DOCUMENTS

| | | | | |
|---|---|---|---|---|
| 5,701,372 A | * | 12/1997 | Magel | G02B 6/2861 |
| | | | | 385/32 |
| 9,696,492 B1 | * | 7/2017 | Cox | G02F 2/004 |
| 2009/0295505 A1 | * | 12/2009 | Mohammadi | H10N 30/40 |
| | | | | 333/191 |

OTHER PUBLICATIONS

Kittlaus, E. A. et al., "Electrically driven acousto-optics and broadband non-reciprocity in silicon photonics," Nature Photonics (2021) 15:43-52.

Kushwaha, M. S. et al., "Acoustic Band Structure of Periodic Elastic Composites," Physic Review Letters (1993) 71 (13):2022-2025.

Sohn, D. B. et al., "Time-reversal symmetry breaking with acoustic pumping of nanophotonic circuits," Nature Photonics (2018) 12:91-97.

Zhou, Y. et al., "Intermodal strong coupling and wideband, low-loss isolation in silicon," arXiv:2211.05864, https://doi.org/10.48550/arXiv.2211.05864 arXiv-issued DOI via DataCite, (2022) 25 pages.

* cited by examiner $E_2(x,y)$ $\varepsilon_{xx}(x,y)$

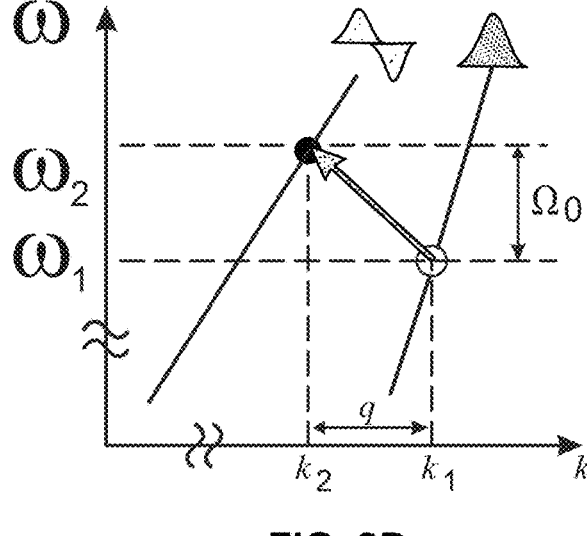
FIG. 2D
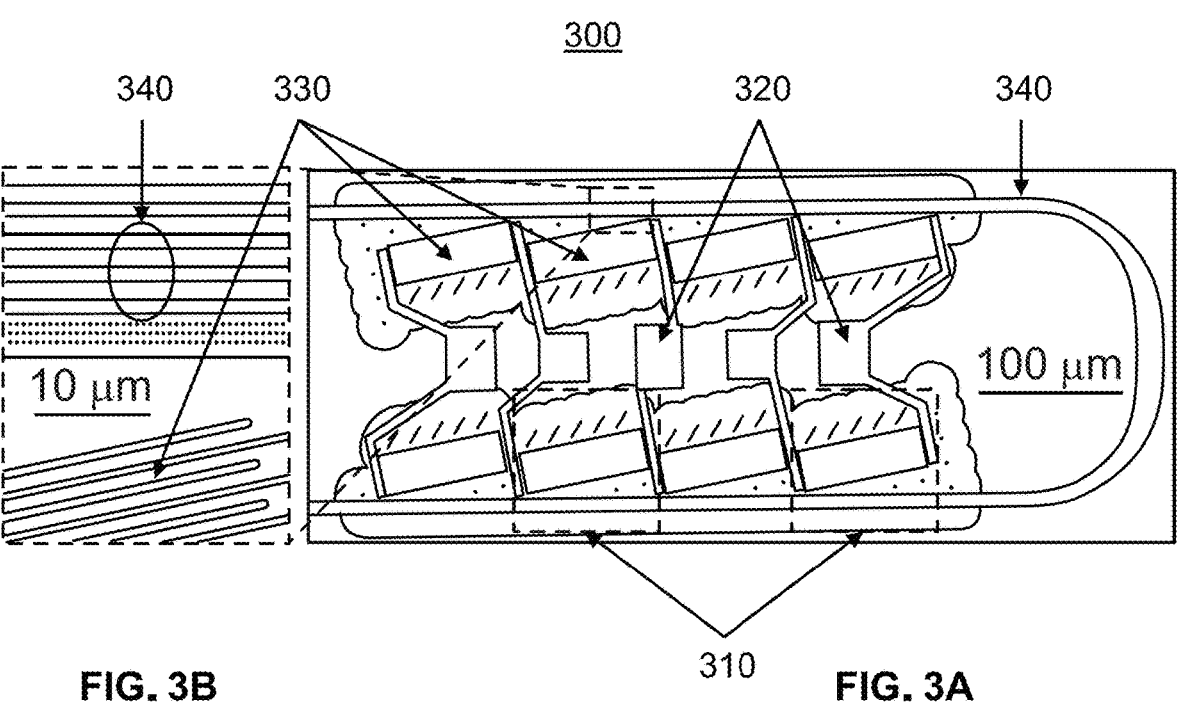
300
340    330    320    340
FIG. 3B    310    FIG. 3A

$E_1(x,y)$ $E_2(x,y)$

WIDEBAND ACOUSTO-OPTIC MODULATOR/ISOLATOR IN INTEGRATED PHOTONICS

STATEMENT OF GOVERNMENT SUPPORT

This invention was made with Government support under Contract No. DE-NA0003525 awarded by the United States Department of Energy/National Nuclear Security Administration. The U.S. Government has certain rights in the invention.

BACKGROUND OF THE INVENTION

Field of the Invention

The present invention relates to a wideband acousto-optic modulator or isolator employing strong intermodal coupling and a spiral optomechanical waveguide driven by multiple interdigitated transducers.

Brief Description of the Related Art

Controllable forms of strong coupling can be used to hybridize, swap, and entangle a variety of systems in the mechanical, microwave, and optical domain. Strong coupling is produced when the coupling rate between two modes or resonances exceeds their dissipation rates, giving rise to Rabi oscillations that are characteristic of fast energy exchanges between the two modes. In optics, dynamic processes enabled by strong coupling in high Q-factor micro-photonic cavities have yielded optical storage, quantum signal processing, frequency conversion, and optical isolation, over narrow bandwidths that are characteristic of the high Q-factor modes.

The need exists, however, for a device having strong coupling between bands of photonic states, possessing a continuum of modes, which could provide a path towards wideband integrated photonic functionalities that bring a host of distinct behaviors and benefits.

SUMMARY OF THE INVENTION

One aspect of the present invention relates to a device incorporating strong interband coupling with a multi-mode spiral-shaped optomechanical waveguide. This can include strongly coupling two traveling spatial optical modes utilizing electrically-driven phonons via an acousto-optic scattering process. Various embodiments of the present invention have demonstrated Rabi-like energy exchange between the two spatial optical modes. When various embodiments are tuned to operate at unity energy conversion, i.e., converting all the input light from one spatial optical mode to the other, one can produce various functions. As an example, one embodiment corresponds to a single-sideband, suppressed-carrier, acousto-optical modulator (AOM), which demonstrated a pump suppression ratio of >55 dB and an insertion loss of 2.08 dB. Another embodiment corresponds to a frequency-neutral optical isolator, which demonstrated <1 dB insertion loss and 10 dB of isolation over a 59 GHz bandwidth. This demonstrated optical isolation bandwidth represents over a factor of 50 bandwidth enhancement compared to prior art lossless integrated acousto-optic isolators.

In at least one embodiment of the invention, an acousto-optic device comprises a spiral-shaped optomechanical waveguide including one or more loops (the spiral-shaped optomechanical waveguide supporting first and second spatial optical modes), and one or more interdigitated transducers (IDTs) mechanically coupled to the spiral-shaped optomechanical waveguide (the one or more IDTs generating phonons and directing the phonons in a phonon-launch direction toward the spiral-shaped optomechanical waveguide, the phonons causing interband coupling between the first and second spatial optical modes for light in each of the one or more loops in the spiral-shaped optomechanical waveguide, the phonon-launch direction of each of the one or more IDTs being non-perpendicular to the spiral-shaped optomechanical waveguide, an IDT-loop product, corresponding to a product of a quantity of the one or more IDTs and a quantity of the one or loops, being greater than or equal to two).

In various embodiments, the spiral-shaped optomechanical waveguide includes one of an ovoid spiral shape, a circular spiral shape, or a polygonal spiral shape; the spiral-shaped optomechanical waveguide doubles back on itself; the spiral-shaped optomechanical waveguide includes one of silicon, silicon nitride, lithium niobate, or tantalum oxide; a first subset of the one or more IDTs is located adjacent one another and adjacent a first side of the spiral-shaped optomechanical waveguide, and a second subset of the one or more IDTs is located adjacent one another and adjacent a second side of the spiral-shaped optomechanical waveguide (the second side of the spiral-shaped optomechanical waveguide opposite the first side of the spiral-shaped optomechanical waveguide); each of the one or more IDTs includes a piezoelectric IDT; and each piezoelectric IDT includes one of AlN, ScAlN, BAlN, or $LiNbO_3$.

In various other embodiments, the acousto-optic device further comprises one or more phonon confining elements located adjacent to the spiral-shaped optomechanical waveguide (each of the one or more phonon confining elements confining phonons from the one or more IDTs to the spiral-shaped optomechanical waveguide); each of the one or more phonon confining elements includes a phononic crystal or a slot; the acousto-optic device further comprises a suspended structure (at least a portion of the spiral-shaped optomechanical waveguide located on the suspended structure); and at least a portion of each of the one or more IDTs is located on the suspended structure.

In yet other embodiments, the acousto-optic device is an acousto-optic modulator, and the acousto-optic device further comprises a first spatial mode multiplexer optically coupled to a first end of the spiral-shaped optomechanical waveguide (the first spatial mode multiplexer receiving light from the spiral-shaped optomechanical waveguide and outputting a portion of the light having one of the first or second spatial optical modes); and the acousto-optic device is an acousto-optic modulator, and the acousto-optic device further comprises a second spatial mode multiplexer optically coupled to a second end of the spiral-shaped optomechanical waveguide (the second spatial mode multiplexer receiving input light and outputting to the spiral-shaped optomechanical waveguide a portion of the input light having one of the first or second spatial optical modes).

In still other embodiments, the acousto-optic device is an optical isolator, and the acousto-optic device further comprises a first spatial mode multiplexer optically coupled to a first end of the spiral-shaped optomechanical waveguide (the first spatial mode multiplexer receiving first input light, outputting to the spiral-shaped optomechanical waveguide a portion of the first input light having one of the first or second spatial optical modes (the portion of the first input light passing through the spiral-shaped optomechanical waveguide becoming first processed light), receiving second processed light from the spiral-shaped optomechanical waveguide, and blocking the second processed light), and a second spatial mode multiplexer optically coupled to a second end of the spiral-shaped optomechanical waveguide (the second end of the spiral-shaped optomechanical waveguide opposite the first end of the spiral-shaped optomechanical waveguide, the second spatial mode multiplexer receiving first processed light from the spiral-shaped optomechanical waveguide, outputting a portion of the first processed light having the one of the first or second spatial optical modes, receiving second input light, and outputting to the spiral-shaped optomechanical waveguide a portion of the second input light having the one of the first or second spatial optical modes (the portion of the second input light passing through the spiral-shaped optomechanical waveguide becoming second processed light)); and the acousto-optic device is fabricated using CMOS-compatible processes.

In at least one embodiment of the invention, an optical isolator comprises a first spatial mode multiplexer, a first nonreciprocal spatial mode beamsplitter including at least one first interdigitated transducer (IDT) and a first optomechanical waveguide (the at least one first IDT mechanically coupled to the first optomechanical waveguide and the first optomechanical waveguide optically coupled to the first spatial mode multiplexer), a dispersion balanced delay line optically coupled to the first nonreciprocal spatial mode beamsplitter (the dispersion balanced delay line minimizing dispersion between light in first and second spatial optical modes), a second nonreciprocal spatial mode beamsplitter including at least one second IDT and a second optomechanical waveguide (the at least one second IDT mechanically coupled to the second optomechanical waveguide and the second optomechanical waveguide optically coupled to the dispersion balanced delay line), and a second spatial mode multiplexer optically coupled to the second nonreciprocal spatial mode beamsplitter, each of the at least one first and second IDTs generating phonons and directing the phonons in a corresponding phonon-launch direction toward a corresponding one of the first and second optomechanical waveguides, the phonons causing interband coupling between the first and second spatial optical modes for light in a corresponding one of the first and second optomechanical waveguides, the corresponding phonon-launch direction of each of the at least one first and second IDTs being non-perpendicular to a corresponding one of the first and second optomechanical waveguides.

In various embodiments, the dispersion balanced delay line includes a dispersion engineered waveguide structure (the dispersion engineered waveguide structure controlling a dispersion of the first and second spatial optical modes); the dispersion balanced delay line includes a third spatial mode multiplexer optically coupled to the first nonreciprocal spatial mode beamsplitter, the dispersion balanced delay line includes first and second single-mode delay lines (the first and second single-mode delay lines optically coupled to the third mode multiplexer), and a fourth spatial mode multiplexer optically coupled to the first and second single-mode delay lines and to the second nonreciprocal spatial mode beamsplitter, the lengths of each of the first and second single-mode delay lines equalizing a group delay across the optical isolator.

In various other embodiments, each of the first and second nonreciprocal spatial mode beamsplitters further includes one or more corresponding phonon confining elements located adjacent to a corresponding one of the first and second optomechanical waveguides (each of the one or more phonon confining elements confining phonons from a corresponding one of the at least one first and second IDTs to a corresponding one of the first and second optomechanical waveguides, each of the one or more phonon confining elements including a phononic crystal or a slot), and a suspended structure (at least a portion of a corresponding one of the first and second optomechanical waveguides located on a corresponding suspended structure); and each of the at least one first and second IDTs includes a piezoelectric IDT (each piezoelectric IDT including one of AlN, ScAlN, BAlN, or LiNbO$_3$).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 2A-2C illustrate various simulated spatial optical and acoustic modes within an optomechanical waveguide of an acousto-optic device in accordance with at least one embodiment of the present invention, while FIG. 2D illustrates the permitted optical transition within the acousto-optic device.

FIGS. 3A and 3B illustrate a fabricated multi-pass device in accordance with at least one embodiment of the present invention.

FIG. 6A illustrates the measured optical output power of each of three tones from an acousto-optic modulator (AOM) in accordance with at least one embodiment of the present invention, while

FIG. 8A illustrates the phase-matching conditions for the acousto-optic scattering process employed by an optical isolator in accordance with at least one embodiment of the present invention, while

DETAILED DESCRIPTION OF THE INVENTION

The terms "a" and "an" do not denote a limitation of quantity, but rather denote the presence of at least one of the referenced items. The term "or" means "and/or." The terms "comprising," "having," "including," and "containing" are to be construed as open-ended terms (i.e., meaning "including, but not limited to").

Acousto-Optic Device Design

Figure 1A:
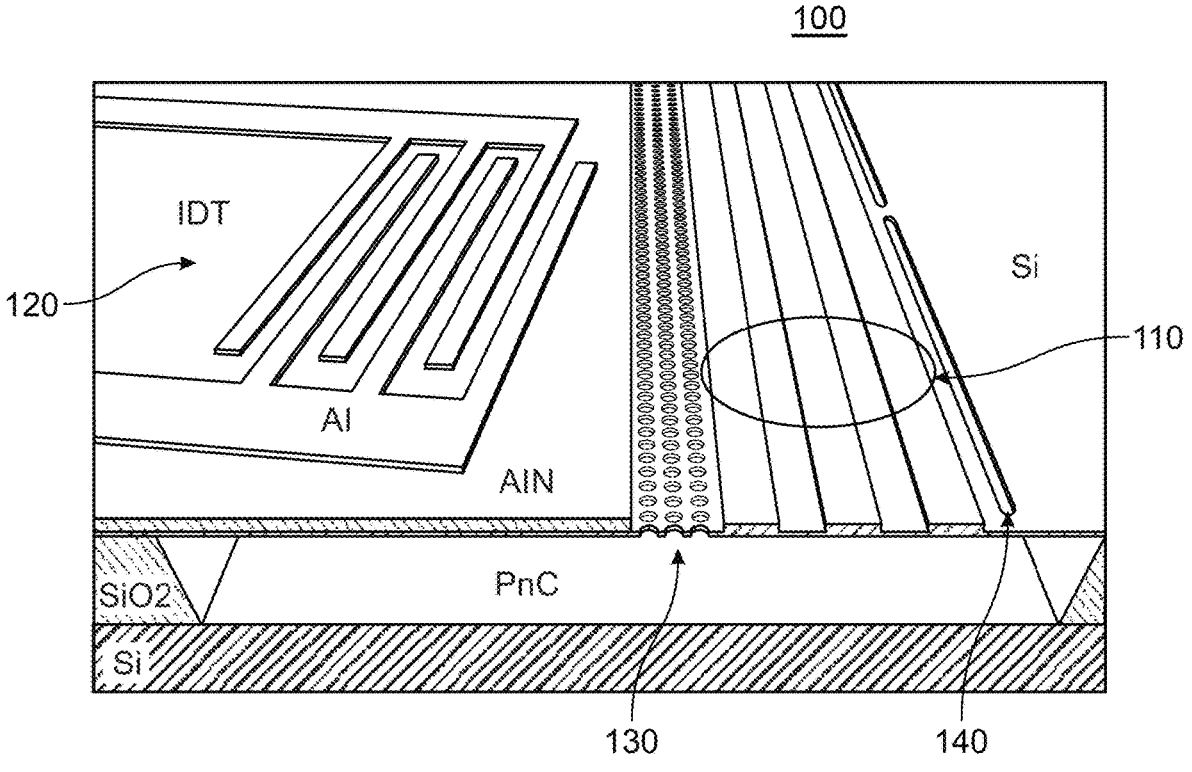
FIGS. 1A-1C illustrate an acousto-optic device in accordance with at least one embodiment of the present invention.

In accordance with at least one embodiment of the present invention, an acousto-optic device 100, as illustrated in cross-sectional form in FIG. 1A, is fabricated on an AlN-on-SOI platform using CMOS-compatible processes, as described below. The acousto-optic device 100 includes a spiral-shaped, triple-pass, silicon optomechanical waveguide 110 that produces efficient acousto-optic scattering when phonons, emitted by a plurality of piezoelectric interdigitated transducers (IDTs) 120, interact with light carried by the optomechanical waveguide 110. The optomechanical waveguide 110 may be formed of other materials depending upon the operating wavelength, and may include, for example, SiN, LiNbO$_3$, or Ta$_2$O$_5$. The IDTs 120 consist of Al electrodes on a polycrystalline AlN layer on a silicon layer. Other embodiments of the present invention may employ IDTs 120 formed of other piezoelectric materials including, for example, ScAlN, BAlN, or LiNbO$_3$. The IDTs 120 are driven by a microwave signal generator (element 430 in FIG. 4) at a frequency $\Omega_0/(2\pi)\sim3.1$ GHZ. The IDTs 120 are mechanically coupled to the optomechanical waveguide 110, and generate phonons that propagate towards the optomechanical waveguide 110. To confine the phonons to the top surface, the oxide under-cladding below the optomechanical waveguide 110, and preferably the IDTs 120, is removed. The resulting suspended structure reduces mechanical dissipation, which is required for optimal device performance. A phononic crystal (PnC) 130 and slots 140 border the optomechanical waveguide 110 on the left and right sides of FIG. 1A, respectively. The phononic crystal 130 and the slots 140 laterally confine the phonons to the acousto-optic interaction region and further enhance the acoustic quality factor to Q~200. The phononic crystal 130 and the slots 140 are termed phonon confining elements. See, M. S. Kushwaha et al., "Acoustic Band Structure of Periodic Elastic Composites," Physical Review Letters, vol. 71, pp. 2022-2025 (1993), for a description of phononic crystals.

Figure 1B:
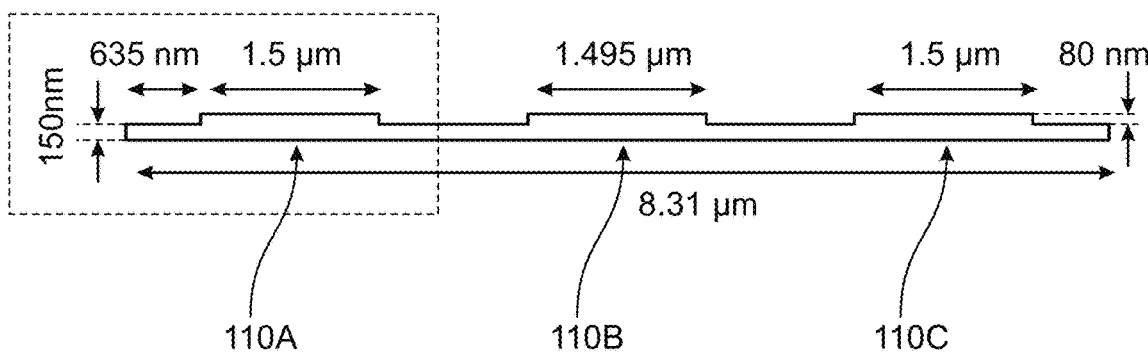
Figure 2A:
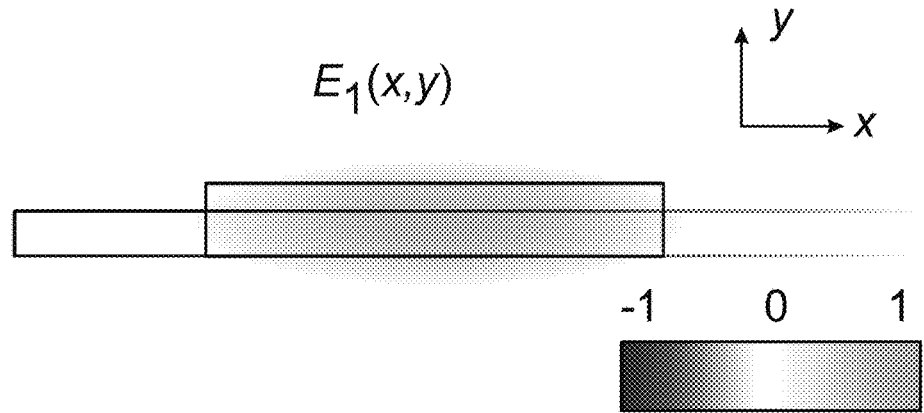
Figure 2B:
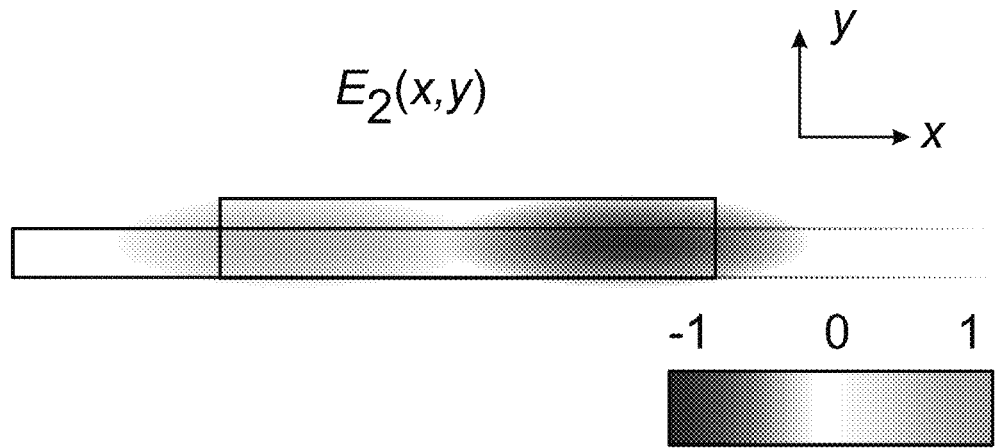
Figure 2C:
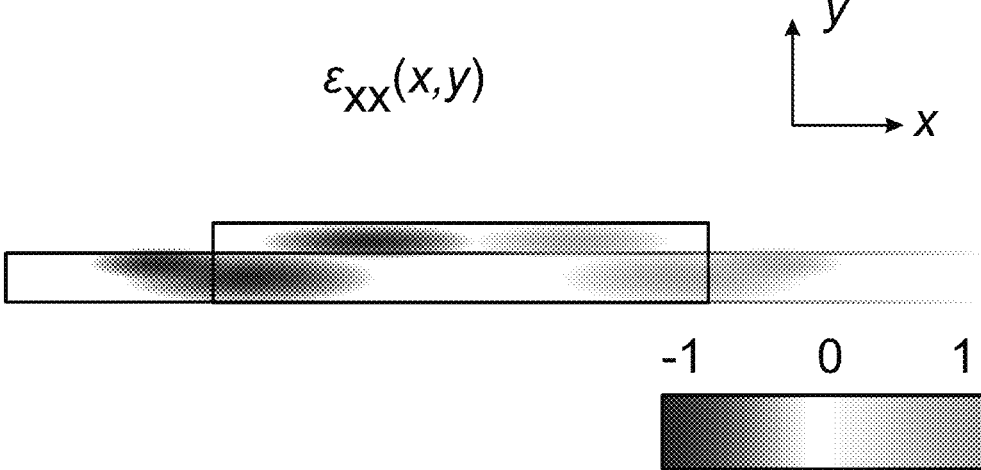

The optomechanical waveguide 110 contains three ridges 110A-110C, as illustrated in FIG. 1B, that serve as optical waveguides. Each of the three ridges 110A-110C correspond to a respective loop in the spiral-shaped optomechanical waveguide 110. Each of the three ridges 110A-110C supports low-loss symmetric (simulated in FIG. 2A) and antisymmetric (simulated in FIG. 2B) spatial optical modes. The middle ridge 110B is narrower than the outer ridges to reduce evanescent coupling between the adjacent ridges 110A, 110C. By design, the strain profile associated with the driven phonons extends across all three ridges 110A-110C. This ensures that the acoustic mode overlaps with the spatial optical modes in each of the three ridges 110A-110C. FIG. 2C illustrates the simulated strain profile in one of the ridges 110A-110C. While the following will focus primarily on two spatial optical modes (one symmetric and one antisymmetric), various other embodiments of the invention may employ two spatial optical modes in which both are symmetric, or both are antisymmetric. Thus, the term "spatial optical modes" includes three cases: (1) one (or more) symmetric spatial optical modes and one (or more) antisymmetric spatial optical mode, (2) two (or more) symmetric spatial optical modes, and (3) two (or more) antisymmetric optical modes.

The acoustic mode generates strong interband coupling between the symmetric and antisymmetric spatial optical modes in each ridge 110A-110C when both energy conservation ($\omega_2=\omega_1+\Omega_0$) and phase-matching ($k_2(\omega_2)=k_1(\omega_1)-q$) are satisfied, as illustrated in FIG. 2D. Here, q is the wavevector component of the acoustic wave along the waveguide direction, determined by the pitch of the IDTs 120 and the angle between the IDTs 120 and the optomechanical waveguide 110, and $\omega_1$ ($k_1$) and $\omega_2$ ($k_2$) are the frequencies (wavevectors) of the guided spatial optical modes. Given perfect phase matching, the interband conversion process is described by the following equations of motion:

$$\frac{d\bar{a}_1}{dz} + \frac{1}{2}\alpha_1\bar{a}_1 = -i\frac{g^*}{v_1}\bar{a}_2\bar{b}\dagger, \tag{Eq. 1}$$

$$\frac{d\bar{a}_2}{dz} + \frac{1}{2}\alpha_2\bar{a}_2 = -i\frac{g}{v_2}\bar{a}_1\bar{b}, \tag{Eq. 2}$$

where $\bar{a}_i$, $\alpha_i$ and $v_i$ are the envelop field amplitude, spatial decay rate, and group velocity, respectively, of the ith spatial optical mode. The product $|\bar{b}g|$ of the phonon envelop field amplitude, $\bar{b}$, and acousto-optic coupling rate, g, gives the enhanced intermodal coupling rate. When injecting input light with power $$P_1^{in}$$

into the symmetric spatial optical mode (mode 1), the optical output power $$P_i^{out}$$

from each ridge can be approximated as:

$$P_1^{out} \approx P_1^{in}e^{-\alpha L_{tot}}\cos^2\left(\frac{|\bar{b}g|}{\sqrt{v_1v_2}}L_a\right), \tag{Eq. 3}$$

$$P_2^{out} \approx P_1^{in}e^{-\alpha L_{tot}}\sin^2\left(\frac{|\bar{b}g|}{\sqrt{v_1v_2}}L_a\right), \tag{Eq. 4}$$

assuming $\alpha_1 \approx \alpha_2 \approx \alpha$. $L_{tot}$ and $L_a$ correspond to the total device length and the length of the active region, respectively. It is the active region length $L_a$ that replaces the dependence on time that is encountered in typical Rabi physics. Equations 3 and 4 show that the power in each spatial optical mode oscillates as a function of the active region length $L_a$ and, crucially, a fixed active region length $L_a$ can be controlled by varying the strength of the phonon field. Neglecting propagation loss, strong coupling is reached in the acousto-optic device 100 when $$|\bar{b}g| > \sqrt{v_1 v_2}/L_a.$$

Light is transferred from one spatial optical mode to the other with unity efficiency when $$|\bar{b}| = \frac{\sqrt{v_1 v_2}}{2|g|L_a}.$$

Figure 1C:
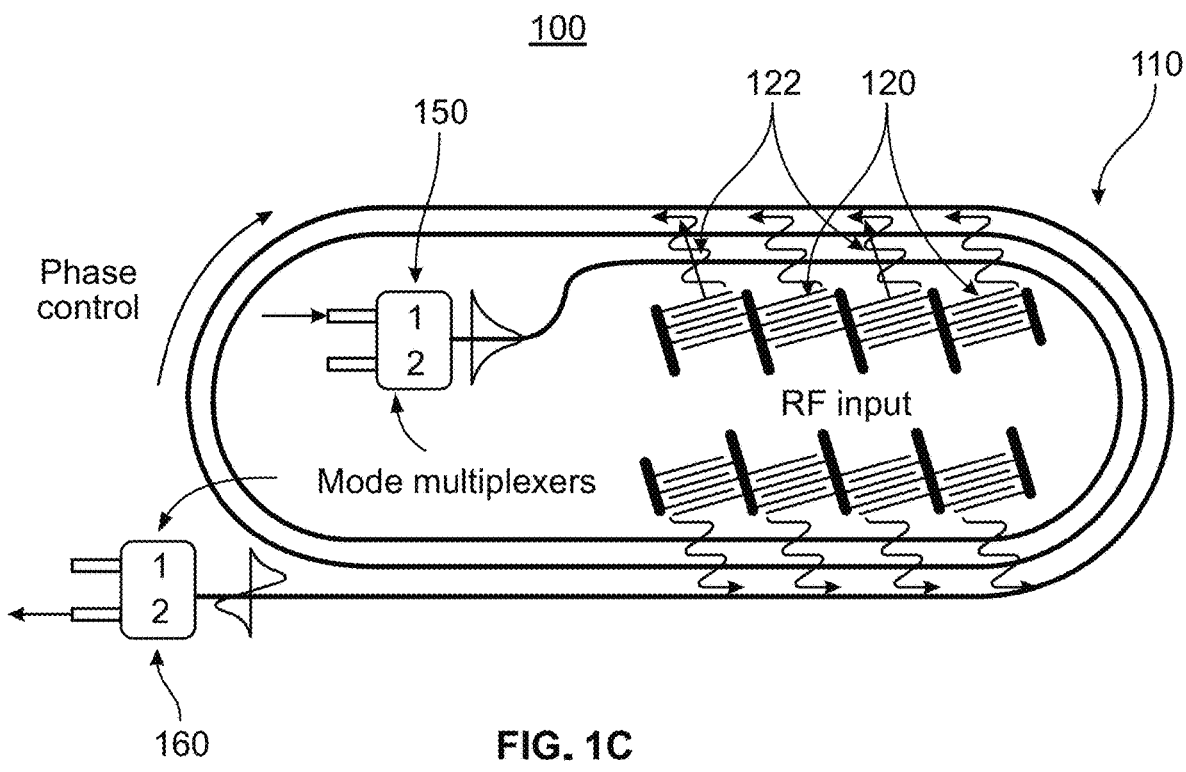

Hence, extending the active region length $L_a$ will reduce the phonon amplitude $|\bar{b}|$ required for unity conversion, boosting the efficiency of the acousto-optic device 100. To leverage this insight, the acousto-optic device 100 includes eight acousto-optic "unit cells" coupled to the multi-pass spiral-shaped optomechanical waveguide 110, as illustrated in FIG. 1C. Each unit cell contains one of the IDTs 120 and a short optomechanical waveguide segment having a length $L \approx 150$ μm. Note that as illustrated in both FIGS. 1A and 1C, a phonon launch direction 122 of the IDT 120 in each unit cell is at an angle, i.e., non-perpendicular, to its corresponding short optomechanical waveguide segment. While the embodiment illustrated in FIG. 1C results in the photons and the phonons in the optomechanical waveguide 110 traveling in opposite, i.e., counter-propagating, directions, this is not required. In other embodiments, one can change the phonon launch direction 122 so that the photons and the phonons in the optomechanical waveguide 110 travel in the same, i.e., co-propagating, direction. The co-propagating embodiment will require a different design for the IDTs 120 as the phase condition, illustrated in FIG. 2D, must still be satisfied.

The embodiment illustrated in FIG. 1C produces a total active region length of $L_a=NL$, where N=24 is the number of acousto-optic interaction segments (8 unit cells×3 passes), which reduces the phonon power $|\bar{b}|^2$ required for unity conversion by a factor of $N^2$. Note that the eight unit cells are readily enabled by employing an optomechanical waveguide 110 in the shape of an ovoid spiral, i.e., the major axis of the spiral is greater than the minor axis of the spiral, as illustrated in FIG. 1C. As will be appreciated by one of skill, the optomechanical waveguide could be in the form of a circular spiral, with, for example, the unit cells equally spaced around the circular spiral. This approach can be beneficial in certain embodiments of the present invention, though it may complicate routing of the RF signals to the IDTs. In still other embodiments, the spiral optomechanical waveguide may have a polygonal shape, with rounded corners to reduce optical losses. An input spatial mode multiplexer 150 optically couples the portion of the input light having a predetermined spatial optical mode into the optomechanical waveguide 110, while an output spatial mode multiplexer 160 optically couples output light of a predetermined spatial optical mode out of optomechanical waveguide 110. By measuring the difference between the powers of the input and output light, one can quantify the total inter-band energy transfer produced by acousto-optic scattering over the length of the spiral-shaped, optomechanical waveguide 110.

The embodiment illustrated in FIG. 1C is a "unidirectional" spiral-shaped, optomechanical waveguide 110 as light enters an "inside" end of the optomechanical waveguide 110 and exits an "outside" end of the spiral. This is not required. In other embodiments, the spiral-shaped optomechanical waveguide may be bidirectional as the light both enters and exits "outside" ends of the optomechanical waveguide, as the optomechanical waveguide "doubles back" on itself at the center. This simplifies optical coupling to the spiral-shaped, optomechanical waveguide, as a coupling waveguide need not go "over" the optomechanical waveguide to reach the "inside" end. This bidirectional spiral-shaped, optomechanical waveguide does, however, require a wider (or narrower) width for the return portion of the optomechanical waveguide so that phase matching is disrupted, and the light retains the correct spatial optical mode on its return trip from the center.

Both the input and output spatial mode multiplexers 150, 160 are of the 2×1 type. The input and output spatial mode multiplexers 150, 160 each has two ports on a first side, these two ports passing light having symmetric and antisymmetric spatial optical modes, respectively. The input and output spatial mode multiplexers 150, 160 each has a single port on a second side, this single port passing light having either or both of a symmetric or an antisymmetric spatial optical mode. As illustrated in FIGS. 1 and 7, typically only one of the two ports on the first side will be optically coupled to the rest of the optical system (not illustrated). In other embodiments, the input and output spatial mode multiplexers 150, 160 may be implemented using a waveguide taper. A waveguide taper supports two spatial optical modes at its input, but only supports one of the two spatial optical modes at its output, having radiated the other of the two spatial optical modes. A waveguide taper thus implements a spatial optical mode filtering function.

The acousto-optic device 100 (and thus the acousto-optic modulator (AOM) and the optical isolator described below) may be fabricated on single-crystal, silicon-on-insulator (SOI) wafers using widely available CMOS-compatible production processes. Features in the silicon, oxide, aluminum nitride, and aluminum metal may be patterned and defined with deep-UV photolithography and plasma etching. After processing the optical and phonon confining structures in the silicon device layer, plasma-enhanced chemical vapor deposited (PECVD) can be used to deposit the oxide, while chemical mechanical polishing (CMP) can be used to thin the oxide to the desired thickness, which can serve as a mask and etch stop for the subsequent AlN and Al layers, respectively. The AlN piezoelectric film may be deposited using RF sputtering such that the c-axis of the crystal grains are oriented normal to the wafer plane (fiber texture). The electrodes may be defined and patterned in an aluminum film. Suspended structures can be created through a vapor hydrogen fluoride (VHF) release process at the die level, which removes the top oxide etch mask and undercuts a targeted distance of the device layer through defined openings to the buried oxide. Wet chemical-based etches may alternatively be used for this release process. As will be appreciated by one of skill, the thicknesses, widths, and separations of the various features will be a function of the intended operating wavelength $\lambda$ and the frequency of the RF signal driving the IDTs 120.

While the acousto-optic device 100 illustrated in FIGS. 1A-1C includes an optomechanical waveguide 110 in the shape of an ovoid spiral having three ridges 110A-110C (three loops), and eight IDTs 120, other embodiments may employ more or less than each of these. For example, if the suspended structure illustrated in FIG. 1A can support a spiral-shaped optomechanical waveguide with more than three ridges (three loops), the acousto-optic interaction can increase, thereby improving performance of the acousto-optic device. Alternatively, if a more physically robust structure is required for an application, the suspended structure may need to be narrower, thereby limiting the optomechanical waveguide to a spiral having only two (or perhaps one) ridge (loop). (For the avoidance of doubt, a spiral-shaped optomechanical waveguide may have a rotation as small as 180°, i.e., one loop forming a "C" shape.) This will reduce the total acousto-optic interaction, and thus reduce performance of the acousto-optic device. In like manner, if the ovoid spiral formed by the optomechanical waveguide can be stretched in the long dimension, i.e., be made even more ovoid, the acousto-optic device may incorporate more than eight IDTs. This would produce greater acousto-optic interaction, thereby improving performance of the acousto-optic device. Conversely, if a smaller spiral must be employed, perhaps for real estate reasons, a smaller number of IDTs would reduce the acousto-optic interaction, thereby reducing performance of the acousto-optic device. The minimum IDT-loop product that would improve performance of an acousto-optic device in accordance with the present invention over the prior art would be two. This minimum IDT-loop product may be achieved in two different ways. The first way to achieve an IDT-loop product of two would be through the use of a spiral-shaped optomechanical waveguide having a single loop with two IDTs. The two IDTs could, for example, be adjacent to each other or on opposite sides of the spiral-shaped optomechanical waveguide. One advantage of having the two IDTs adjacent each other is that it provides for a consistent phase relationship between the two IDTs, which may be more difficult if the two IDTs are on opposite sides of the spiral-shaped optomechanical waveguide. The second way to achieve an IDT-loop product of two would be through the use of a spiral-shaped optomechanical waveguide having two loops with a single IDT.

Experimental Results

FIG. 3A illustrates a fabricated multi-pass device 300. The eight IDT unit cells 310 of the multi-pass device 300 are wired to five electrical contact pads 320 and connected to a dual-channel RF probe using a GSGSG (Ground/Signal) configuration. Each RF signal, applied to a corresponding one of the contact pads 320, drives 4 IDTs 330, and the relative phase between each contact pad is controlled by an external microwave phase shifter (element 436 in FIG. 4). FIG. 3B shows a close-up of the optomechanical waveguide 340 and the angled IDTs 330.

Figure 4:
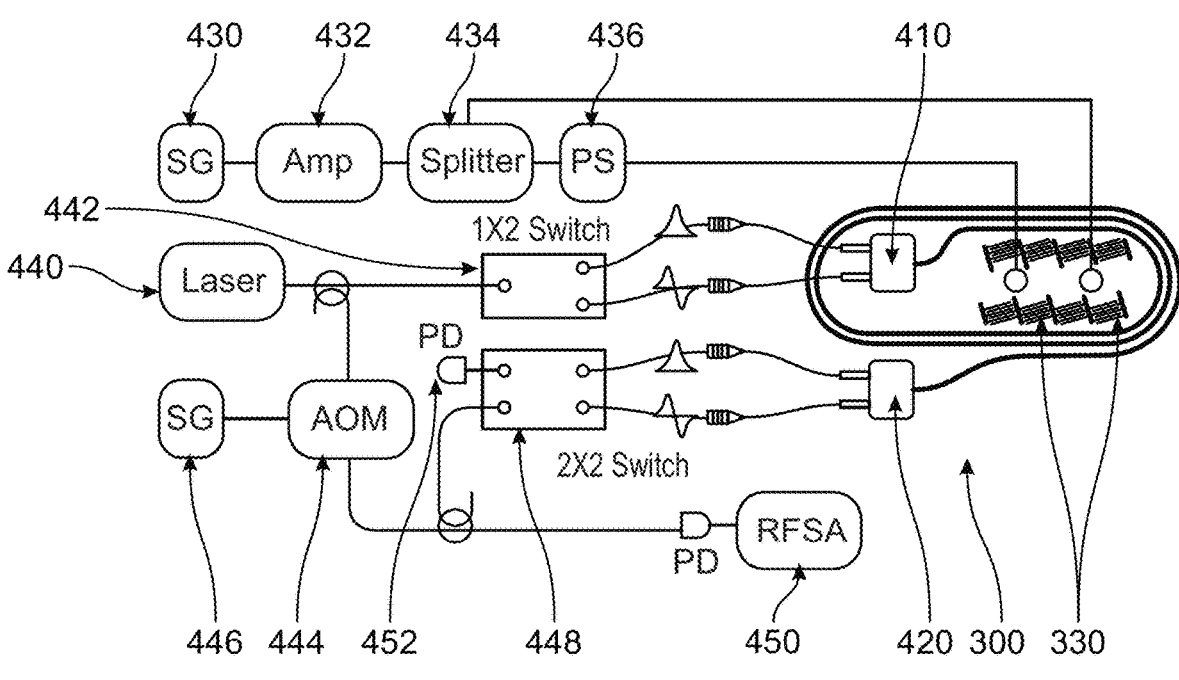
FIG. 4 illustrates a spectroscopy characterization setup that may be used to characterize an acousto-optic device in accordance with at least one embodiment of the present invention.

To investigate the spatial optical mode conversion process in the multi-pass device 300, the spectroscopy characterization setup illustrated in FIG. 4 was used. By optically coupling input light (power≈1 mW) in either the symmetric or antisymmetric spatial optical mode to the optomechanical waveguide 340 via an input spatial mode multiplexer 410, while analyzing the optical power exiting the distinct ports of an output spatial mode multiplexer 420, the symmetric-to-antisymmetric and antisymmetric-to-symmetric spatial optical mode conversion processes were characterized. The output of the multi-pass device 300 was monitored using two techniques employing a 2×2 optical switch 448. The first technique, employing a heterodyne approach, provided access to a frequency resolved measurement, whereas the second technique, employing an optical power meter, gave quick access to the total optical power present at either output port of the output spatial mode multiplexer 420.

The overall characterization testbed further included a signal generator (SG) 430 for generating the RF signal driving the IDTs 330. The RF signal was amplified by an amplifier (Amp) 432, with the amplified RF signal split 50/50 by an RF splitter 434. One of the RF signals subsequently passes through a phase shifter (PS) 436, before the RF signals are applied to the IDTs 330. The light from a laser 440 is split, with part of the signal going to a 1×2 optical switch 442, which is optically coupled to the input spatial mode multiplexer 410. The remaining portion of the light from the laser 440 is fed to an AOM 444 driven by a signal generator (SG) 446. The output of the AOM 444 is optically coupled with a first output of a 2×2 optical switch 448, and subsequently fed to an RF spectrum analyzer (RFSA) 450, thereby implementing the heterodyne monitoring approach. A second output of the 2×2 optical switch 448 is fed to a photodiode (PD) 452 coupled to an optical power meter (not illustrated), thereby implementing the optical power monitoring approach.

Figure 5A:
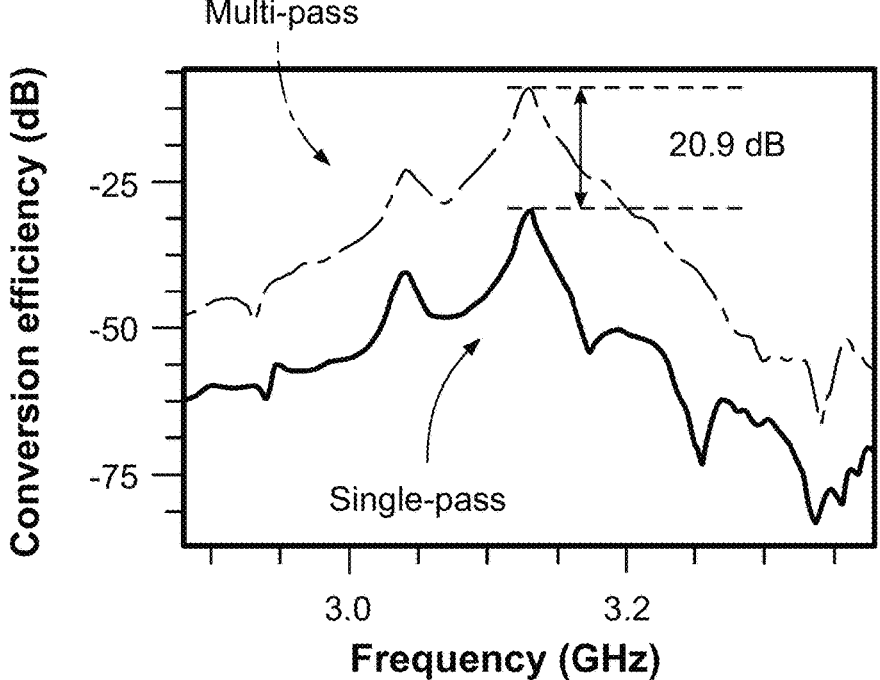
FIG. 5A illustrates the measured conversion efficiency of acousto-optic scattering from symmetric to antisymmetric spatial optical modes as a function of the RF drive frequency for an acousto-optic device in accordance with at least one embodiment of the present invention.

The measured conversion efficiency of the acousto-optic scattering from symmetric-to-antisymmetric spatial optical modes is illustrated as a function of the RF drive frequency, with $P_{RF}$=8.92 dBm, in FIG. 5A (dashed line). The peak spatial optical mode conversion occurred at $\Omega_0/(2\pi)$=3.13 GHz, i.e., the resonant frequency of the acoustic waveguide mode. This experimentally observed acoustic resonance frequency is close to the simulated eigenfrequency of $\Omega_0/(2\pi)$=3.24 GHz, illustrated in FIG. 5B. A 20.9 dB enhancement in optical conversion efficiency in the multi-pass device 300, see FIG. 5A (dashed line), was observed when compared to a reference device that has only a single pass, i.e., a single unit cell (N=1), see FIG. 5A (solid line). Note that there is a small offset between the resonance of the IDTs 330, as illustrated in FIG. 5C, and the resonance of the optomechanical waveguide 340 for both the multi-pass 300 and single-pass devices. Decreasing this frequency offset would improve the optical conversion efficiency for a fixed $P_{RF}$.

The observed 20.9 dB enhancement in the optical conversion efficiency in the multi-pass device 300 relative to the single-pass reference device closely matches a theoretical prediction of 23.5 dB. This theoretical prediction accounts for the increase in the number of passes, the transduction efficiency improvement of the IDTs 330 (see FIG. 5C, in which the larger transducer area leads to better impedance matching, and the (small) inhomogeneous broadening of the acoustic linewidth in the multi-pass device 300). It should be noted that an even larger transducer area would provide better electro-acoustic matching between the IDTs 330 and the three ridges 110A-110C of the optomechanical waveguide 110. The difference of 2.62 dB is attributed to imperfections in the phase control between the 24 segments of the IDTs 330. Nevertheless, the improved performance of the multi-pass device 300 permits observation of a full Rabi-cycle, as discussed below.

Figure 5B:
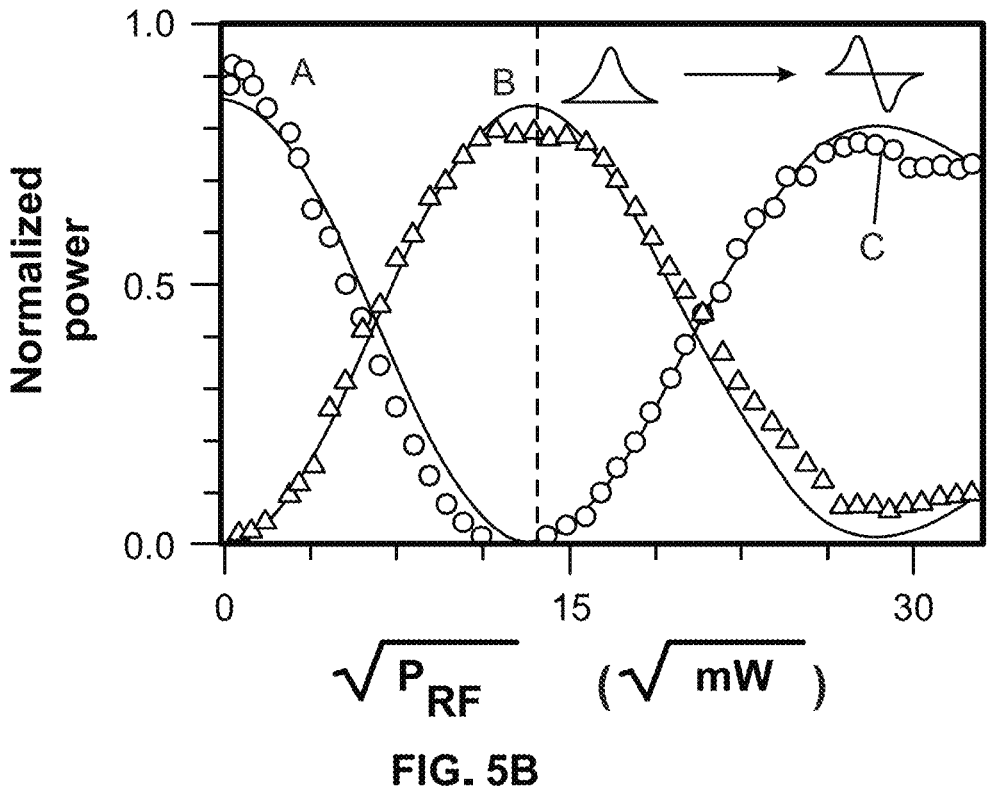
FIGS. 5B and 5D illustrate the measured and simulated acoustic resonance frequency for the symmetric and antisymmetric input spatial optical modes, respectively, for the acousto-optic device.
Figure 5C:
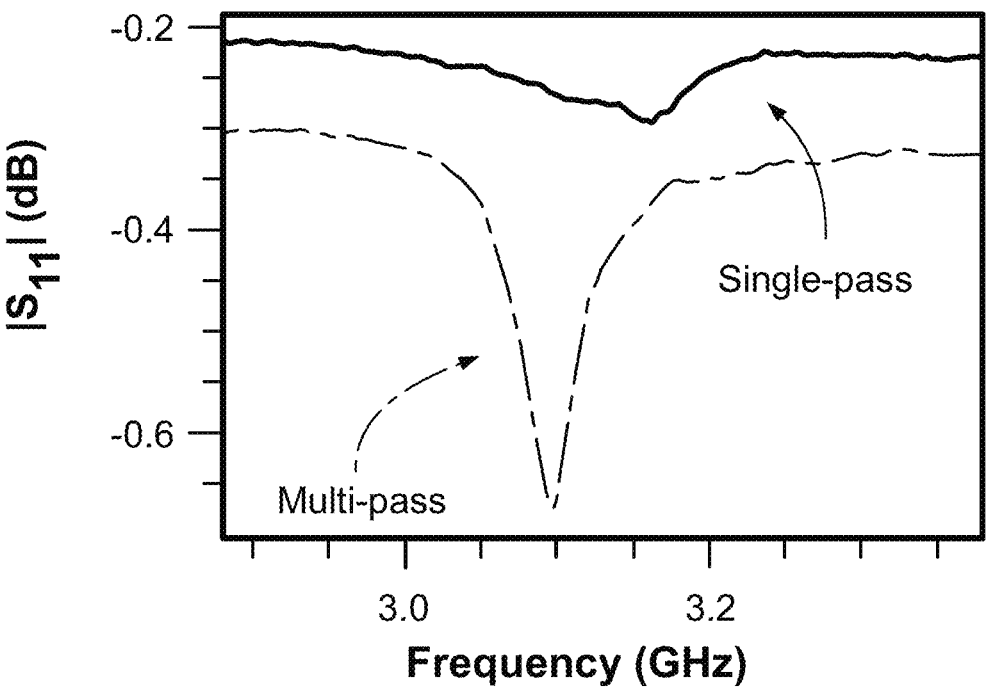
FIG. 5C illustrates the offset between the resonance of the interdigitated transducers (IDTs) in the acousto-optic device.
Figure 5D:
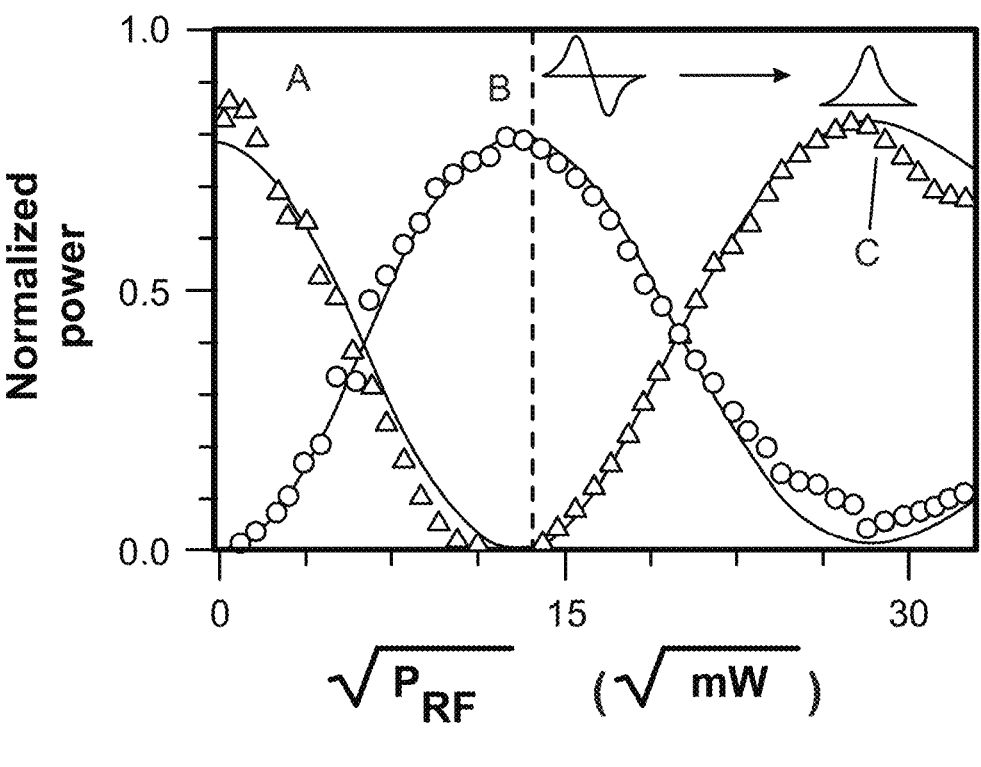

FIG. 5B illustrates the normalized optical power in the symmetric (circles) and antisymmetric (triangles) spatial optical modes at the output of the output spatial mode multiplexer 420 as a function of $P_{RF}$. At a low $P_{RF}$, corresponding to point A, input light in the symmetric spatial optical mode passes through the multi-pass device 300 unaltered, whereas at an intermediate $P_{RF}$, corresponding to point B, all power initially in the symmetric spatial optical mode is swapped into the antisymmetric spatial optical mode. At a high $P_{RF}$, corresponding to point C, the power is converted back into the symmetric spatial optical mode at the exit of the multi-pass device 300, i.e., the output ports of the output spatial mode multiplexer 420. The experimental data is consistent with a model employing a transfer matrix method, see FIG. 5B (black lines). In the multi-pass device 300, the symmetric spatial optical mode features lower spatial loss ($\alpha_1 \approx 7.0$ m$^{-1}$) than the antisymmetric spatial optical mode ($\alpha_2 \approx 20.0$ m$^{-1}$), giving rise to different oscillation amplitudes at points A, B, and C of FIG. 5B. FIG. 5D illustrates the complementary measurement with an antisymmetric spatial optical mode input to the multi-pass device 300 via the input spatial mode multiplexer 410, and shows the reverse process. This demonstrates that the multi-pass device 300, which increases the effective active region length $L_a$ by a factor of 24, can oscillate through an entire Rabi-like energy exchange.

While the multi-pass device 300, as illustrated in FIG. 4, includes an input spatial mode multiplexer 410 and an output spatial mode multiplexer 420, other embodiments may not require both of these spatial mode multiplexers.

Acousto-Optic Modulator

In accordance with at least one embodiment of the present invention, the multi-pass device 200 can be configured to operate as an AOM, injecting input light into the antisymmetric spatial optical mode via the input spatial mode multiplexer 410, and collecting the output from the symmetric spatial optical mode via the output spatial mode multiplexer 420. The AOM was operated at the unity mode conversion point, corresponding to the vertical dashed lines in FIGS. 5B and 5D. This enabled demonstration of a silicon-based AOM with high modulation efficiency, good single-sideband (SSB) selectivity, and a large carrier suppression ratio (CSR), all critical parameters for a practical AOM.

Figure 6A:
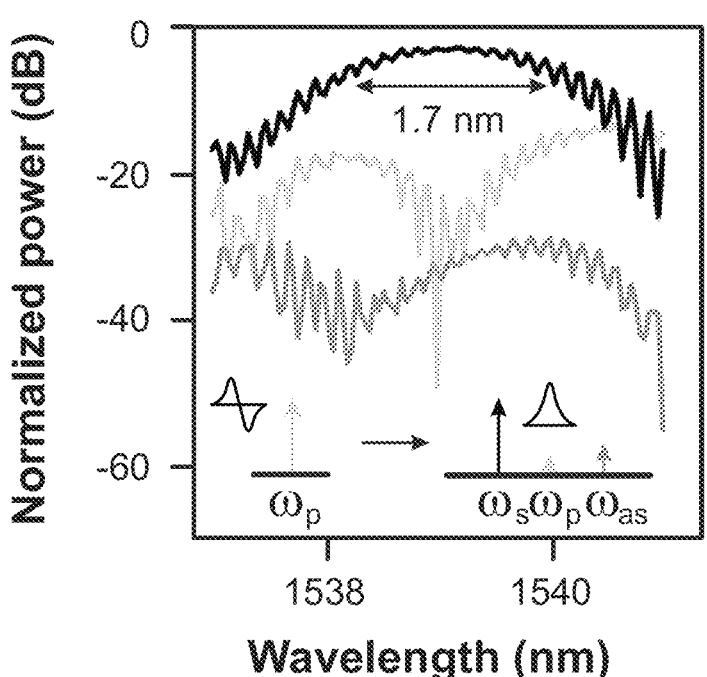

The inset of FIG. 6A illustrates the relevant optical tones for the AOM. Input light at a frequency $\omega_p$ (light gray) is injected into the antisymmetric spatial optical mode. A microwave drive signal of frequency $\Omega_0/(2\pi)=3.13$ GHZ and power $P_{RF}=22.16$ dBm converts the optical input to the symmetric spatial optical mode Stokes sideband at $\omega_s=\omega_p-\Omega_0$. To quantify the performance of the AOM, the frequency resolved optical output collected from the symmetric port of the output spatial mode multiplexer 420 was studied using a heterodyne measurement system. Measurements revealed a strong frequency-shifted Stokes sideband (black), residual optical carrier (light gray), and an unwanted anti-Stokes side-band (dark gray) at frequency $\omega_{as}=\omega_p+\Omega_0$. The optical output power of each of the three tones, measured as a function of optical input wavelength, is illustrated in FIG. 6A. The data is normalized to the injected on-chip optical power.

The 3 dB optical bandwidth for acousto-optic conversion is measured to be 1.7 nm (215 GHz), which could be improved by more compactly positioning the active regions and reducing the total device length. At an operating wavelength $\lambda_p=1539.2$ nm, the conversion efficiency reaches a maximum of −2.08 dB, limited by 1.01 dB of optical propagation loss, ~0.2 dB of loss due to the input and output spatial mode multiplexers 410, 420, and ~0.8 dB of loss due to evanescent coupling between adjacent ridges (loops) in the optomechanical waveguide 340. Alternative designs could reduce the evanescent coupling loss.

Figure 6B:
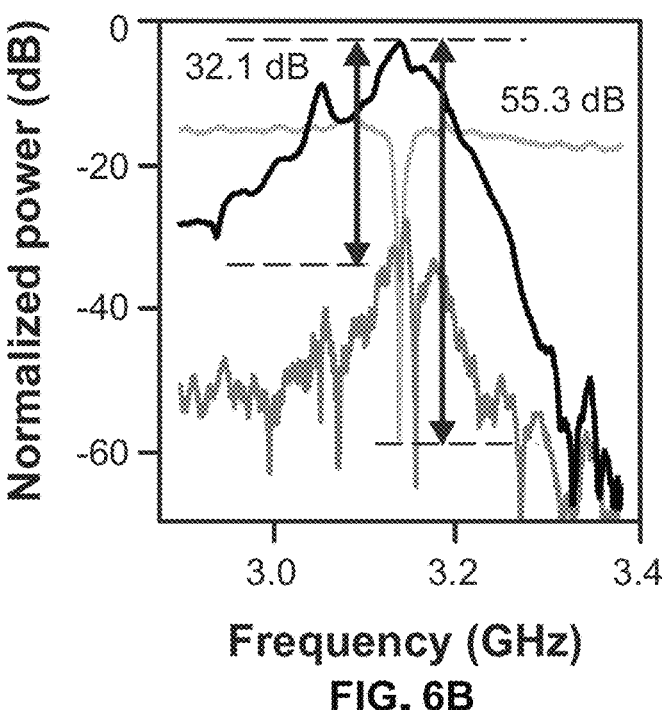
FIG. 6B illustrates the measured carrier suppression ratio and single-sideband suppression of the AOM.

To investigate the CSR and SSB suppression of the AOM, the operating wavelength was fixed at $\lambda_p=1539.2$ nm, corresponding to the maximum conversion efficiency, while the microwave drive frequency was swept around $\Omega_0$, as illustrated in FIG. 6B. The maximum measured carrier suppression was 55.3 dB, equivalent to commercially available AOMs. The SSB suppression is limited by the unwanted anti-Stokes sideband that is generated from deflected acoustic waves in the AOM, i.e., acoustic waves with a different wavevector than initially set by the IDTs 330. As a result, the anti-Stokes process has a non-trivial dependence on wavelength, as illustrated in FIG. 6A. Nevertheless, in this AOM configuration, the multi-pass device 300 achieved a good sideband suppression ratio of 32.1 dB, as illustrated in FIG. 6B.

Wideband, Low-Loss Optical Isolator I

The interband scattering process is inherently nonreciprocal due to the unique phase matching considerations of this interaction. Using the nonreciprocity inherent to this process, one can create a wideband optical isolator 700, illustrated in FIGS. 7A and 7B, based on direction-dependent energy depletion that is made possible by strong acousto-optic coupling. The optical isolator 700 employs the same multi-pass device 300 as the AOM described above. Experiments showed that the optical isolator 700 was practical as it had both a low insertion loss (IL) and broad bandwidth.

Figure 7A:
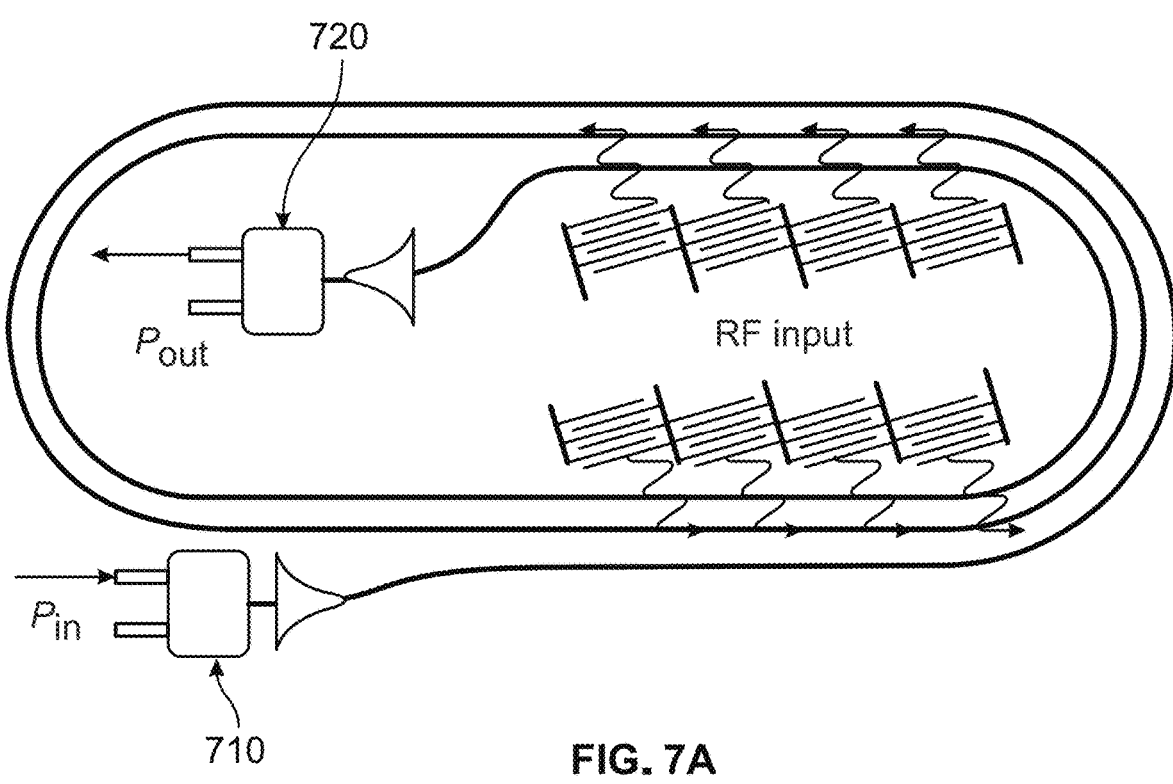
FIGS. 7A and 7B illustrate a first optical isolator in accordance with at least one embodiment of the present invention.
Figure 7B:
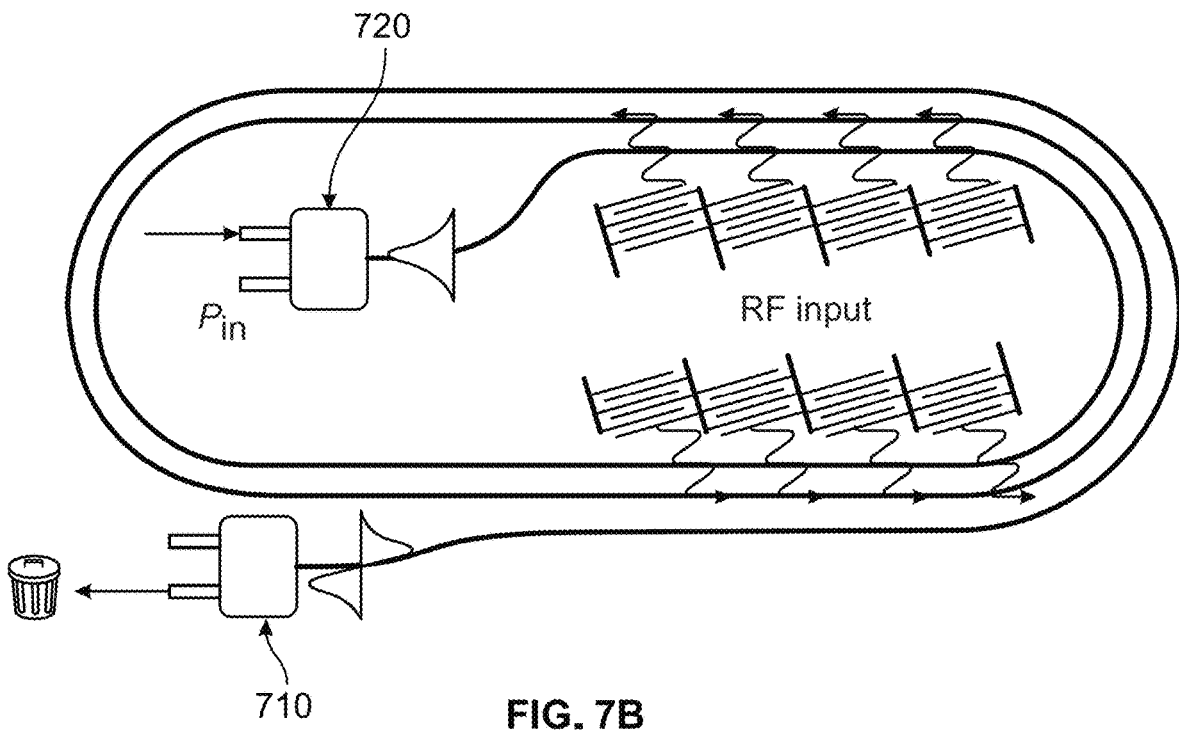
Figure 8A:
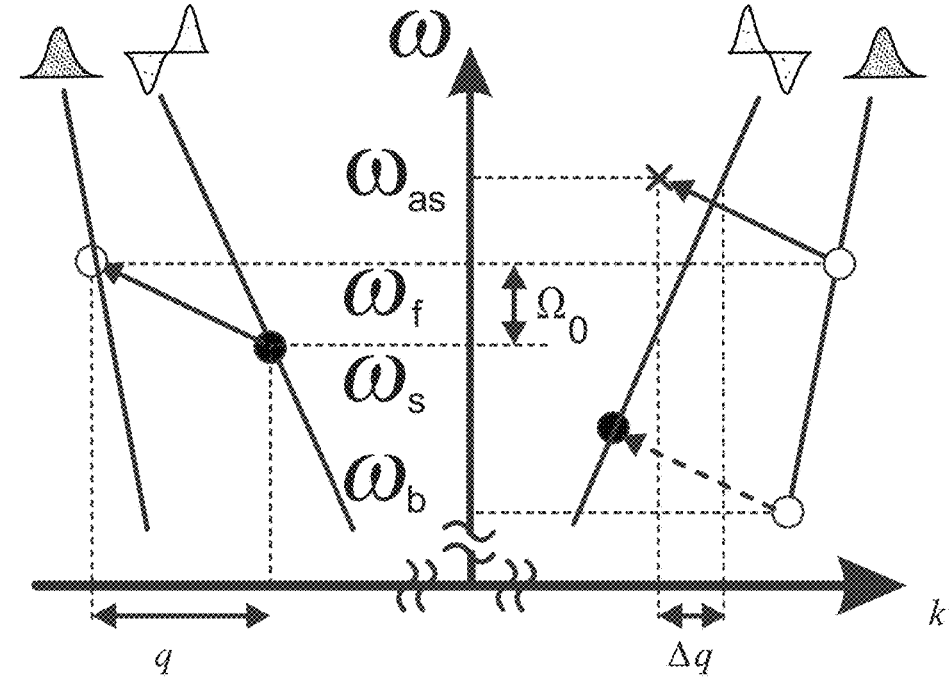

The origin of optical non-reciprocity in this optical isolator 700 can be understood by examining the phase-matching condition for the acousto-optic scattering process. Consider light of a frequency of that is injected in the forward (+k) direction in the symmetric spatial optical mode of the optical isolator 700. The driven anti-Stokes scattering process for this forward traveling wave is phase mismatched:

$$\Delta q \equiv k_1 - k_2 - q \neq 0,$$

as illustrated in FIG. 8A. As a result, the anti-Stokes process is forbidden and the light transmits unimpeded from the symmetric input port of an input spatial mode multiplexer 710 to the symmetric output port of an output spatial mode multiplexer 720, as illustrated in FIG. 7A. By comparison, in the backward direction, illustrated in FIG. 7B, the driven Stokes scattering process is perfectly phase-matched ($\Delta q=0$), and the optical field injected into the symmetric output port of the output spatial mode multiplexer 720 is fully converted to the antisymmetric spatial optical mode, and is removed, i.e., blocked, by the input spatial mode multiplexer 710. The difference between these two processes produces a nonreciprocal response in the optical isolator 700, as it is the directionality of the electrically-driven phonons that breaks the symmetry of the interband scattering process between the forward and backward directions.

Figure 8B:
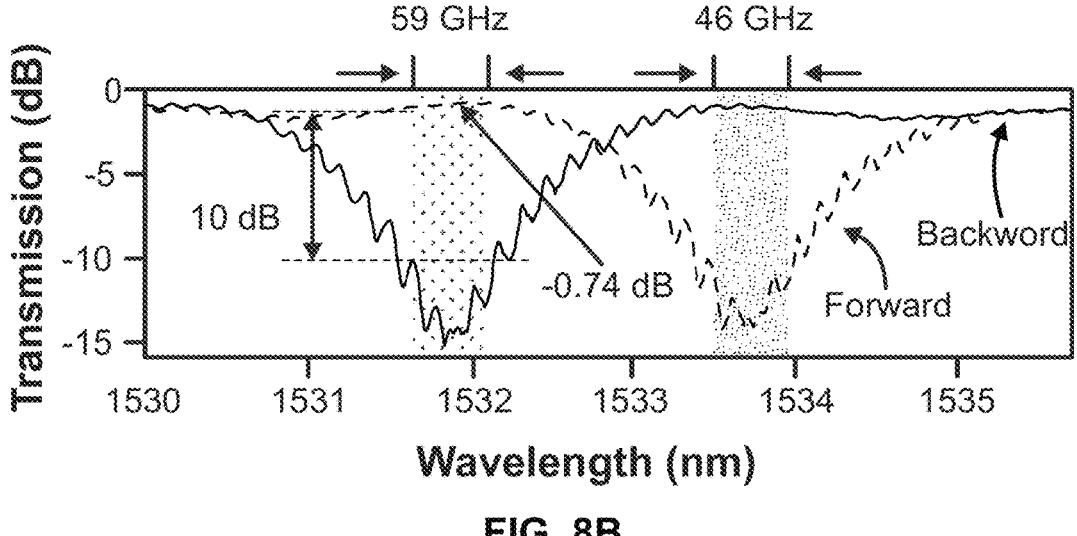
FIG. 8B illustrates the measured isolation of the optical isolator.

The optical isolator 700 experimentally showed a near unity (IL=0.74 dB) optical transmission in the forward direction at an operating wavelength $\lambda=1532.01$ nm, corresponding to $\omega_f$, as illustrated in FIG. 8B. By comparison, light injected in the backward direction at the same operating wavelength is rejected, leading to a maximum isolation of 14.37 dB. These measurements employed an optical power meter to detect the total optical power transmitted in both the forward and backward directions. Wavelength-dependent power transmission measurements in both the forward and backward directions reveal high isolation contrast (10 dB) over an appreciable (59 GHZ) bandwidth indicated by the blue shaded region in FIG. 8B, corresponding to more than a factor of fifty larger isolation bandwidth than prior art non-magnetic optical isolators with comparable insertion losses.

As will be appreciated by one of skill, the optical isolator 700 behaves as an optical isolator in the opposite direction over a second band of wavelengths centered about a different optical frequency $\omega_b$, see FIG. 8A and indicated by the gray shaded region in FIG. 8B. For this band of wavelengths, it is the backward direction in which the phase matching condition is satisfied, as illustrated in FIG. 8A, meaning that backward propagating light is fully transmitted, whereas forward propagating light is blocked.

With further design improvements, significantly higher isolation contrast (30-50 dB) should be attainable as the basis for practical, high performance non-magnetic isolator technologies. Through these experiments, the observed isolation contrast of 14.37 dB is limited by (1) intermodal crosstalk at the optomechanical waveguide bend transitions and (2) spurious evanescent coupling of the adjacent ridges (loops) of the spiral-shaped optomechanical waveguide. Using heterodyne measurement to analyze the spectral content of light transmitted in the backward direction, the optical isolator 700 exhibited a transmission contrast >40 dB under the strictest definition of nonreciprocity, i.e., ignoring the presence of the unwanted tones. In practice, a larger contrast could be implemented by (a) adding extra optical filters that would remove spurious tones resulting from cross-talk, (b) mitigating cross-talk by minimizing evanescent mode coupling, for example, by redesigning the optomechanical waveguide bends and/or the triple ridge portion of the optomechanical waveguide, and/or (c) cascading multiple optical isolators 700. There is one further advantage to cascading two optical isolators. While the output frequency of the first optical isolator is offset by the frequency of the phonons, proper implementation with the same phonon frequency in the second optical isolator can result in the output from the second optical isolator recovering the original frequency.

Wideband, Low-Loss Optical Isolator II

Figure 9A:
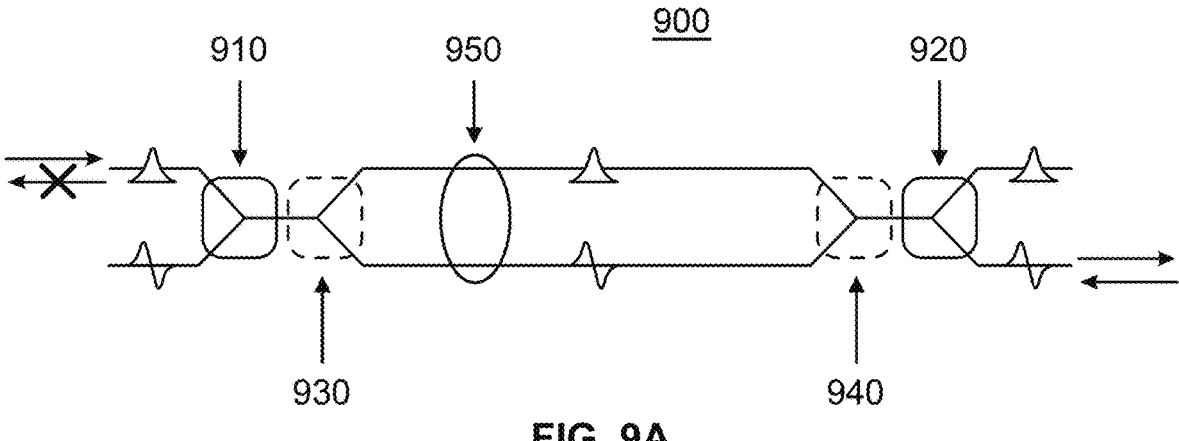
FIGS. 9A-9D illustrate a second optical isolator in accordance with at least one embodiment of the present invention, the spatial mode beamsplitters thereof, the phase-matching conditions thereof, and an illustration thereof, respectively.
Figure 9B:
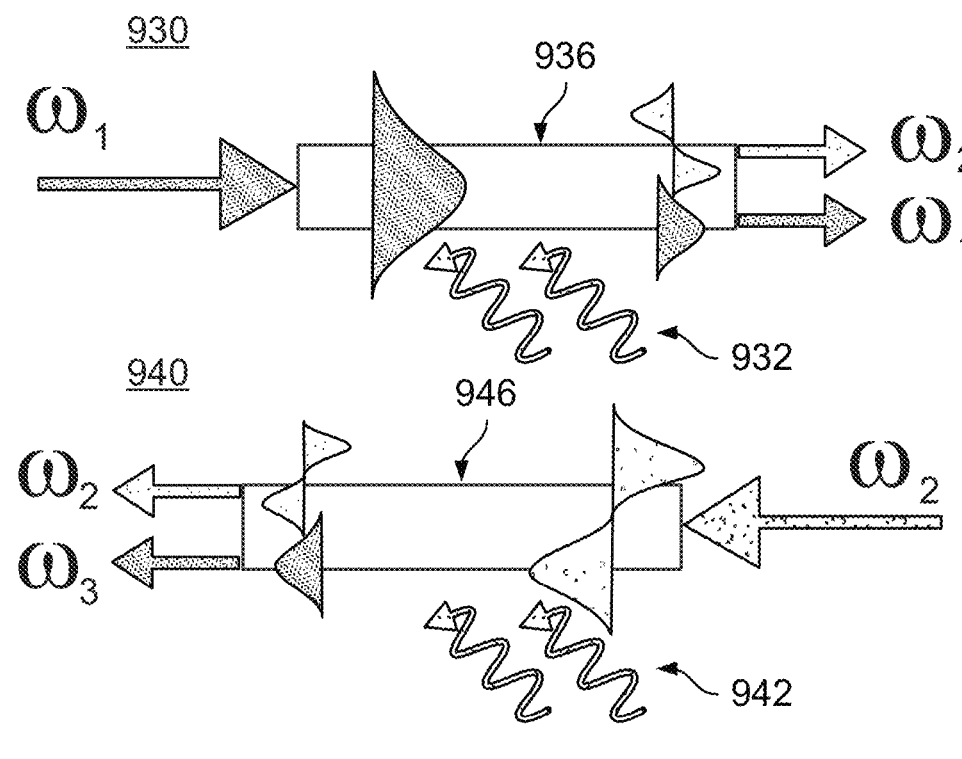
Figure 9C:
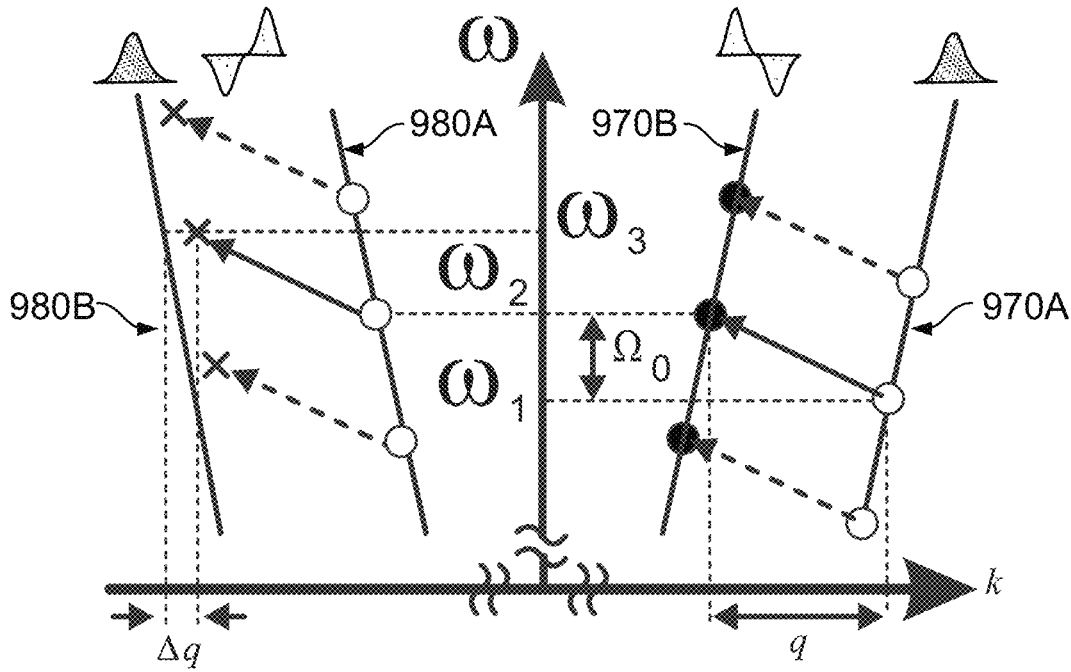
Figure 9D:
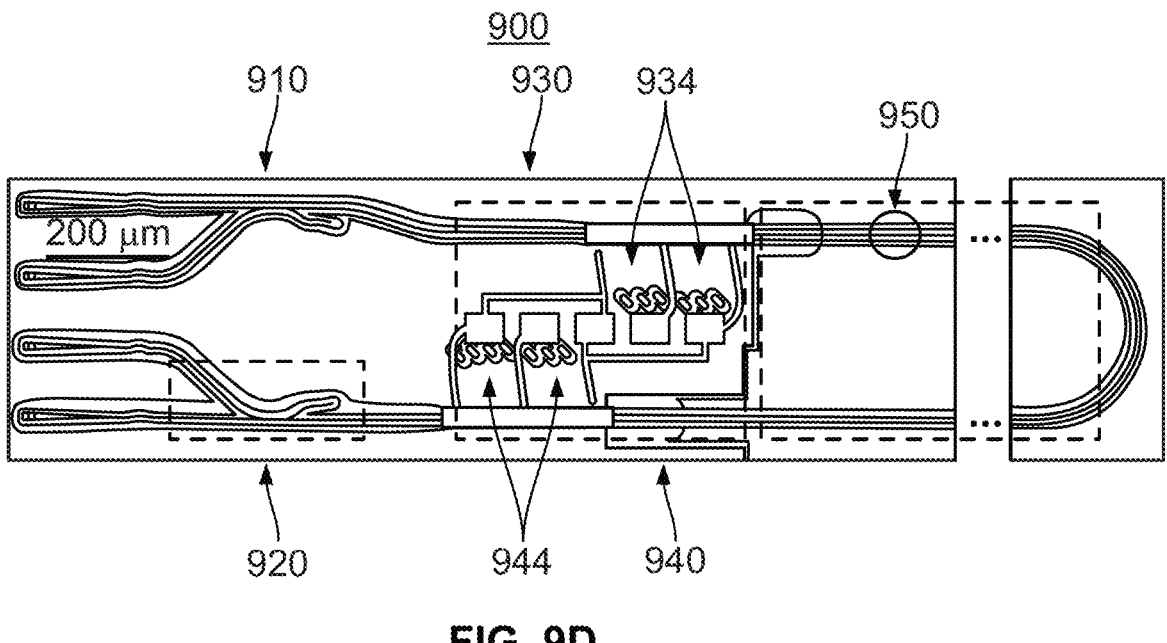

An optical isolator 900, having a second configuration in accordance with one or more embodiments is illustrated in FIG. 9A. The optical isolator 900 is a mode-space Mach-Zehnder interferometer implemented in mode space, with each light path accommodating a distinct transverse spatial waveguide mode. The optical isolator 900 includes input and output spatial mode multiplexers 910, 920 optically coupled to corresponding nonreciprocal input and output spatial mode beamsplitters 930, 940, which are optically coupled to a dispersion-balanced delay line 950. As will be described below, the dispersion balanced waveguide may be implemented in two different manners: a single dual-ridge waveguide (IIA), or as two separate waveguides, each of the two separate waveguides carrying one of the symmetric or antisymmetric spatial optical modes (IIB). The nonreciprocal input and output spatial mode beamsplitters 930, 940 are based on electrically driven indirect photonic transitions, enabling nonreciprocal light splitting between two spatial optical modes. FIG. 9B illustrates the nonreciprocal input (upper) and output (lower) spatial mode beamsplitters 930, 940, along with phonons 932, 942. The nonreciprocal input spatial mode beamsplitter 930 splits the forward propagating symmetric spatial optical mode at frequency $\omega_1$ into an anti-symmetric spatial optical mode at frequency $\omega_2$ via the phonons 932. The nonreciprocal output spatial mode beamsplitter 940 splits the backward traveling anti-symmetric spatial optical mode at frequency $\omega_2$ into a symmetric spatial optical mode at frequency $\omega_3$ via the phonons 942. These corresponding transitions are illustrated in FIG. 9C. The phonons 932, 942, which facilitate the beamsplitting process of the nonreciprocal input and output spatial mode beamsplitters 930, 940, are electrically generated through the use of IDTs 934, 944, as illustrated in FIG. 9D, with the acousto-optic interaction occurring in corresponding optomechanical waveguides 936, 946. FIG. 9B illustrates light entering the optomechanical waveguides 936, 946 from the left and right, respectively, and being subjected to corresponding acousto-optic interactions. Light may also enter the optomechanical waveguides 936, 946 from the right and left respectively (not illustrated) with this light passing through the optomechanical waveguides 936, 946 as the light does not satisfy the phase requirements for acousto-optic interactions to occur, as illustrated in FIG. 9C.

The delay line 950 is precisely designed to enable constructive interference for forward split light and complete cancellation for backward split light, resulting in an isolation contrast exceeding 28 dB. The operational bandwidth of the optical isolator 900 can be expanded by minimizing the relative group delay between the paths of the two spatial optical modes within the optical isolator 900. There are two distinct methods for implementing the dispersion-balanced delay line 950, allowing for more than 10 dB of isolation over a range of 16 nm. Additionally, the optical isolator 900 provides the advantage of external phase tuning, allowing for wavelength tunability and the reconfigurability of the isolation direction.

The operation bandwidth of the optical isolator 900 is determined by the difference in effective group delay between the two optical paths, i.e., along the delay line 950, which is similar to a traditional interferometer. To achieve wideband operation, it is essential to balance the delay line 950 of the optical isolator 900, ensuring a constant phase difference as the operation frequency varies. This is described by the equation:

$$\phi_{forward}(\omega_1 + \Delta\omega) - \phi_{forward}(\omega_1) = (v_{g+} - v_{g-})L\Delta\omega = 0. \qquad \text{(Eq. 5)}$$

In the optical isolator 900, the two optical bands are parallelized, ensuring that $v_{g+} \approx v_{g-}$, to maintain the robustness of the phase-matching condition against frequency changes, as demonstrated by the engineered dispersion curves 970A, 970B, 980A, 980B in FIG. 9C. This results in a large operating wavelength range for the optical isolator 900. This parallelism is accomplished by fine-tuning the dispersion properties of the delay line 950 to offset the group delay difference that emerges in the splitting region.

Wideband, Low-Loss Optical Isolator IIA

Figure 10A:
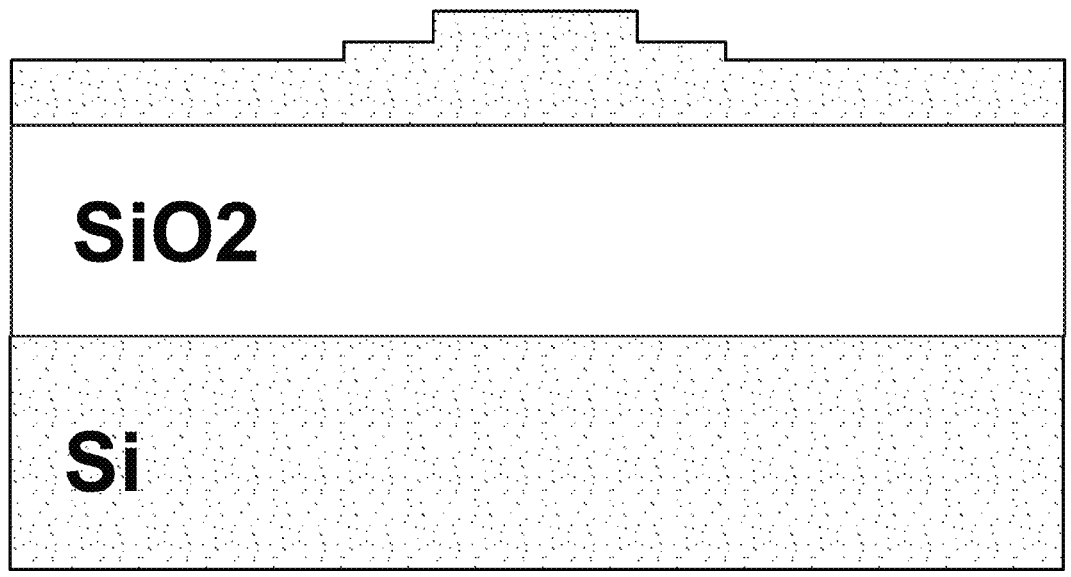
FIGS. 10A and 10B illustrate a dual-ridge waveguide that may be used to implement the second optical isolator in accordance with at least one embodiment of the present invention.
Figure 10B:
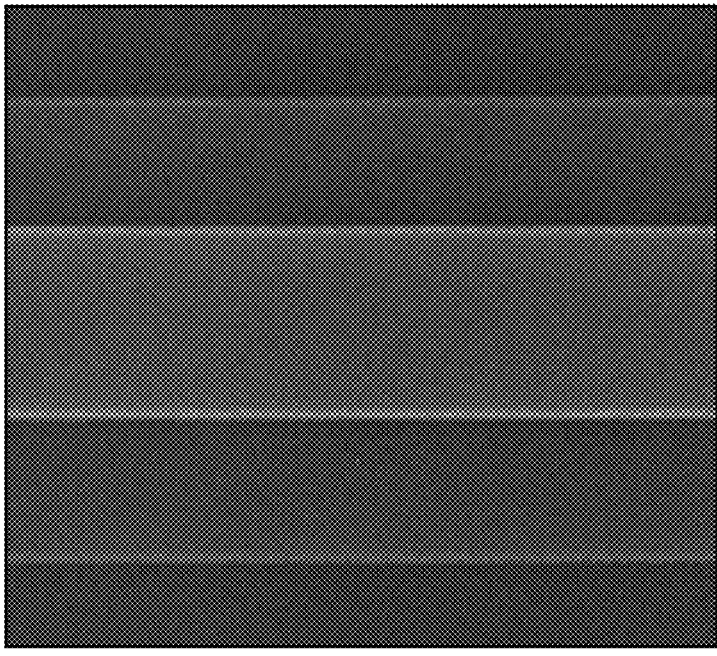
Figure 10C:
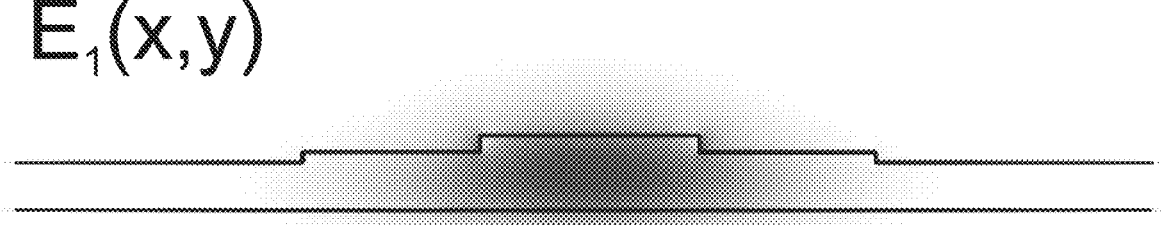
FIGS. 10C and 10D illustrate the spatial optical modes therein.
Figure 10D:
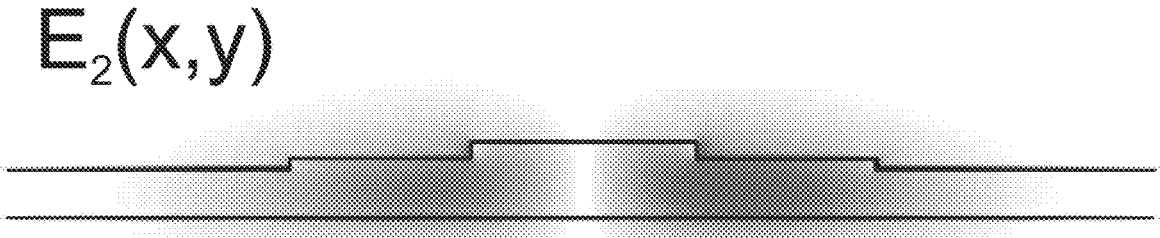
Figure 10E:
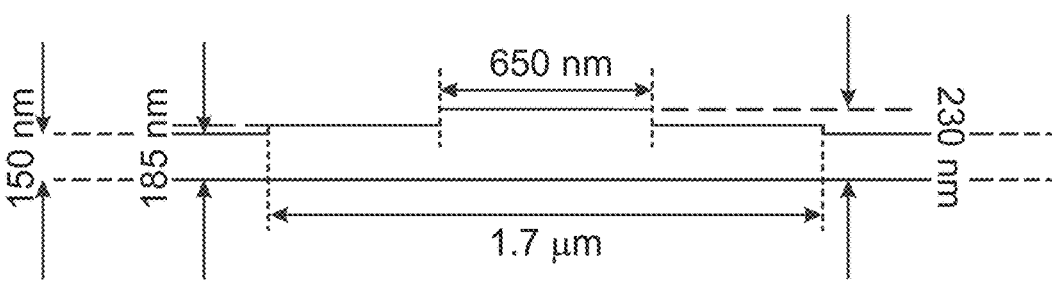
FIG. 10E illustrates the dimensions thereof.

The first technique to balance the delay line 950 involves the use of a dual-ridge waveguide for the delay line 950. This dual-ridge waveguide is illustrated in the cross-section and top-down SEM images in FIGS. 10A and 10B, respectively. The narrow and wide silicon ridges control the dispersion relations of the symmetric (FIG. 10C) and anti-symmetric (FIG. 10D) spatial optical modes, respectively. The narrow and wide silicon ridges can be designed to ensure group delay equalization using the dimensions presented in FIG. 10E. As will be appreciated by one of skill, the actual dimensions of the narrow and wide silicon ridges will be a function of the operating wavelength and the RF frequency driving the IDTs 934, 944. While the dual-ridge waveguide is one form of a dispersion engineered waveguide structure, other dispersion engineered waveguide structures may be employed, for example, multi-ridge or reflowed waveguide structures.

Figures 10F, 11A:
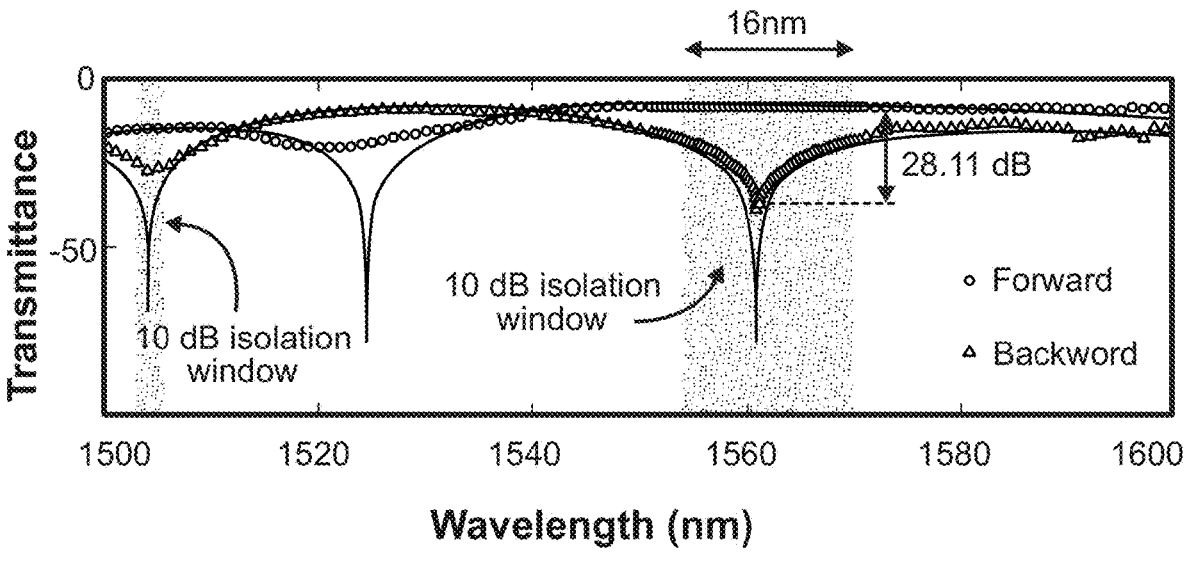
FIG. 10F illustrates the transmission of the dual-ridge waveguide implementation of the second optical isolator.
FIGS. 11A and 11B illustrate a second implementation of the second optical isolator in accordance with at least one embodiment of the present invention.

FIG. 10F illustrates the transmission of the optical isolator 900 having the delay line 950 formed of the dual-ridge waveguide operating in the forward (circles) and backward (triangles) directions. As illustrated, the optical isolator demonstrated a 10 dB isolation bandwidth of 16 nm (right stippled band), with a maximum isolation contrast exceeding 28 dB. The measurements, from monitoring the total optical power output, exhibit slight deviations from the theoretical predictions (black line) due to the presence of intermodal crosstalk in the passive photonic components of the optical isolator 900. At high RF signal drive powers, the insertion loss was ≈2 dB.

Wideband, Low-Loss Optical Isolator IIB

Figure 11B:
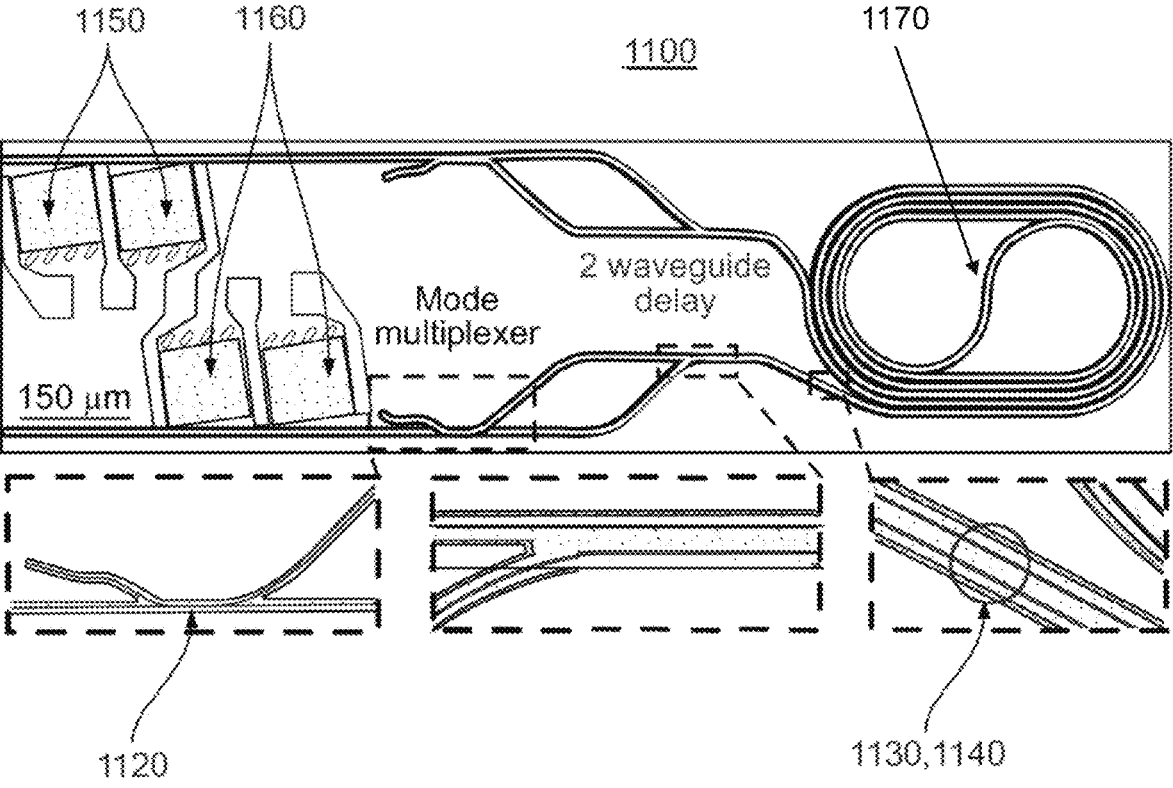

FIG. 11A illustrates an optical isolator 1100 employing a second technique to balance the delay lines. This second technique utilizes two additional spatial mode multiplexers 1110, 1120 to transform the mode-space Mach-Zehnder interferometer found in optical isolator 900 into a single-mode waveguide Mach-Zehnder interferometer. In this second technique, the length of each single-mode delay lines 1130, 1140, each transmitting a corresponding one of the symmetric and antisymmetric spatial optical modes, can be precisely adjusted to achieve equalization of the group delay across the entire interferometer. FIG. 11B is an illustration of the fabricated optical isolator 1100. FIG. 11B illustrates a spiral-shaped design to compactly wrap the two single-mode delay lines 1130, 1140, by having them "double back" on themselves, as indicated at 1170. FIG. 11B also illustrates the two IDTs 1150, 1160. As illustrated, a phase delay θ is included in the driving signal for the second IDT 1160 relative to the driving signal for the first IDT 1150. By having an adjustable phase delay θ, one can reconfigure the isolation direction of the optical isolator 1100.

By integrating single-mode delay lines 1130, 1140, this second technique eliminates the dispersion susceptibility to waveguide bends. While this enables a compact footprint through waveguide wrapping, it also increases vulnerability to intermodal crosstalk in the additional spatial mode multiplexers 1110, 1120. Additionally, the two single-mode delay lines 1130, 1140 feature identical group velocity dispersion (GVD) properties, resulting in a constant relative difference in group delay across different operating wavelengths. This characteristic ensures a constant operation bandwidth, regardless of the specific operating wavelength, which is not achievable with the first technique. A comparison between these two techniques is provided in the following Table 1.

All publications, including but not limited to patents and patent applications, cited in this specification are herein incorporated by reference as though set forth in their entirety in the present application.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An acousto-optic device comprising:
   a spiral-shaped optomechanical waveguide including one or more loops, the spiral-shaped optomechanical waveguide adapted to support first and second spatial optical modes; and
   one or more interdigitated transducers (IDTs) mechanically coupled to the spiral-shaped optomechanical waveguide, the one or more IDTs adapted to generate phonons and to direct the phonons in a phonon-launch direction toward the spiral-shaped optomechanical waveguide, the phonons adapted to cause interband coupling between the first and second spatial optical modes for light in each of the one or more loops in the spiral-shaped optomechanical waveguide, the phonon-launch direction of each of the one or more IDTs being non-perpendicular to the spiral-shaped optomechanical waveguide, an IDT-loop product, corresponding to a product of a quantity of the one or more IDTs and a quantity of the one or more loops, being greater than or equal to two.

2. The acousto-optic device of claim 1, wherein the spiral-shaped optomechanical waveguide includes one of an ovoid spiral shape, a circular spiral shape, or a polygonal spiral shape.

3. The acousto-optic device of claim 1, wherein the spiral-shaped optomechanical waveguide doubles back on itself.

4. The acousto-optic device of claim 1, wherein the spiral-shaped optomechanical waveguide includes one of silicon, silicon nitride, lithium niobate, or tantalum oxide.

5. The acousto-optic device of claim 1, wherein:
   a first subset of the one or more IDTs being located adjacent one another and adjacent a first side of the spiral-shaped optomechanical waveguide; and
   a second subset of the one or more IDTs being located adjacent one another and adjacent a second side of the

TABLE 1

| Comparison of Optical Isolators. | | | | | | |
|---|---|---|---|---|---|---|
| Technique | GVD | Wafer Thickness | Intermodal Crosstalk (Spatial Mode Multiplexers) | Optical Loss (Spatial Mode Multiplexers) | Dispersion Susceptibility (Waveguide Bends) | Footprint |
| Two-Ridge Delay Line | Sensitive | Sensitive | Less Affected | Less Affected | Sensitive | Large |
| Two-Waveguide Delay Lines | Robust | Robust | More Affected | More Affected | N/A | Small |

The underlying design, i.e., the acousto-optic device 100, as illustrated in FIGS. 1A and 1C, may be employed in various applications that include optical routers, modulators, frequency shifters, spectroscopy, filters, and non-magnetic isolators or circulators.

spiral-shaped optomechanical waveguide, the second side of the spiral-shaped optomechanical waveguide opposite the first side of the spiral-shaped optomechanical waveguide.

6. The acousto-optic device of claim 1, wherein each of the one or more IDTs includes a piezoelectric IDT.

7. The acousto-optic device of claim 6, wherein each piezoelectric IDT includes one of AlN, ScAlN, BAlN, or LiNbO₃.

8. The acousto-optic device of claim 1, further comprising one or more phonon confining elements located adjacent to the spiral-shaped optomechanical waveguide, each of the one or more phonon confining elements adapted to confine phonons from the one or more IDTs to the spiral-shaped optomechanical waveguide.

9. The acousto-optic device of claim 8, wherein each of the one or more phonon confining elements includes a phononic crystal or a slot.

10. The acousto-optic device of claim 1, further comprising a suspended structure, at least a portion of the spiral-shaped optomechanical waveguide being located on the suspended structure.

11. The acousto-optic device of claim 10, wherein at least a portion of each of the one or more IDTs is located on the suspended structure.

12. The acousto-optic device of claim 1,
wherein the acousto-optic device is an acousto-optic modulator;
the acousto-optic device further comprising a first spatial mode multiplexer optically coupled to a first end of the spiral-shaped optomechanical waveguide, the first spatial mode multiplexer adapted to:
receive light from the spiral-shaped optomechanical waveguide, and
output a portion of the light having one of the first or second spatial optical modes.

13. The acousto-optic device of claim 12,
the acousto-optic device further comprising a second spatial mode multiplexer optically coupled to a second end of the spiral-shaped optomechanical waveguide, the second spatial mode multiplexer adapted to:
receive input light, and
output to the spiral-shaped optomechanical waveguide a portion of the input light having one of the first or second spatial optical modes.

14. The acousto-optic device of claim 1,
wherein the acousto-optic device is an optical isolator;
the acousto-optic device further comprising a first spatial mode multiplexer optically coupled to a first end of the spiral-shaped optomechanical waveguide, the first spatial mode multiplexer adapted to:
receive first input light,
output to the spiral-shaped optomechanical waveguide a portion of the first input light having one of the first or second spatial optical modes, the portion of the first input light passing through the spiral-shaped optomechanical waveguide becoming first processed light,
receive second processed light from the spiral-shaped optomechanical waveguide, and
block the second processed light; and
a second spatial mode multiplexer optically coupled to a second end of the spiral-shaped optomechanical waveguide, the second end of the spiral-shaped optomechanical waveguide opposite the first end of the spiral-shaped optomechanical waveguide, the second spatial mode multiplexer adapted to:
receive first processed light from the spiral-shaped optomechanical waveguide,
output a portion of the first processed light having the one of the first or second spatial optical modes, receive second input light, and
output to the spiral-shaped optomechanical waveguide a portion of the second input light having the one of the first or second spatial optical modes, the portion of the second input light passing through the spiral-shaped optomechanical waveguide becoming second processed light.

15. The acousto-optic device of claim 1, wherein the acousto-optic device is fabricated using CMOS-compatible processes.

16. An optical isolator comprising:
a first spatial mode multiplexer;
a first nonreciprocal spatial mode beamsplitter including at least one first interdigitated transducer (IDT) and a first optomechanical waveguide, the at least one first IDT mechanically coupled to the first optomechanical waveguide, and the first optomechanical waveguide optically coupled to the first spatial mode multiplexer;
a dispersion balanced delay line optically coupled to the first nonreciprocal spatial mode beamsplitter, the dispersion balanced delay line adapted to minimize dispersion between light in first and second spatial optical modes;
a second nonreciprocal spatial mode beamsplitter including at least one second IDT and a second optomechanical waveguide, the at least one second IDT mechanically coupled to the second optomechanical waveguide, and the second optomechanical waveguide optically coupled to the dispersion balanced delay line; and
a second spatial mode multiplexer optically coupled to the second nonreciprocal spatial mode beamsplitter;
wherein each of the at least one first and second IDTs is adapted to generate phonons and to direct the phonons in a corresponding phonon-launch direction toward a corresponding one of the first and second optomechanical waveguides, the phonons adapted to cause interband coupling between the first and second spatial optical modes for light in a corresponding one of the first and second optomechanical waveguides, the corresponding phonon-launch direction of each of the at least one first and second IDTs being non-perpendicular to a corresponding one of the first and second optomechanical waveguides.

17. The optical isolator of claim 16, wherein the dispersion balanced delay line includes a dispersion engineered waveguide structure, the dispersion engineered waveguide structure adapted to control a dispersion of the first and second spatial optical modes.

18. The optical isolator of claim 16, wherein the dispersion balanced delay line includes:
a third spatial mode multiplexer optically coupled to the first nonreciprocal spatial mode beamsplitter;
the dispersion balanced delay line including first and second single-mode delay lines, the first and second single-mode delay lines optically coupled to the third mode multiplexer; and
a fourth spatial mode multiplexer optically coupled to the first and second single-mode delay lines and to the second nonreciprocal spatial mode beamsplitter;
wherein lengths of each of the first and second single-mode delay lines are adapted to equalize a group delay across the optical isolator.

19. The optical isolator of claim 16, wherein each of the first and second nonreciprocal spatial mode beamsplitters further includes:
one or more corresponding phonon confining elements located adjacent to a corresponding one of the first and second optomechanical waveguides, each of the one or more phonon confining elements adapted to confine phonons from a corresponding one of the at least one first and second IDTs to a corresponding one of the first and second optomechanical waveguides, each of the one or more phonon confining elements including a phononic crystal or a slot; and a suspended structure, at least a portion of a corresponding one of the first and second optomechanical waveguides being located on a corresponding suspended structure.

20. The optical isolator of claim 16, wherein each of the at least one first and second IDTs includes a piezoelectric IDT, each piezoelectric IDT including one of AlN, ScAlN, BAlN, or LiNbO$_3$.

* * * * *